(12) United States Patent
Park et al.

(10) Patent No.: US 11,543,527 B2
(45) Date of Patent: Jan. 3, 2023

(54) BEAM SCANNING APPARATUS AND OPTICAL APPARATUS INCLUDING THE SAME

(71) Applicant: SAMSUNG ELECTRONICS CO., LTD., Suwon-si (KR)

(72) Inventors: Junghyun Park, Seoul (KR);
Tatsuhiro Otsuka, Suwon-si (KR);
Duhyun Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 873 days.

(21) Appl. No.: 16/441,544

(22) Filed: Jun. 14, 2019

(65) Prior Publication Data
US 2020/0150277 A1 May 14, 2020

(30) Foreign Application Priority Data
Nov. 8, 2018 (KR) .................. 10-2018-0136802

(51) Int. Cl.
*G01S 17/42* (2006.01)
*G01S 7/481* (2006.01)
(Continued)

(52) U.S. Cl.
CPC ............ *G01S 17/42* (2013.01); *G01S 7/4817* (2013.01); *G01S 17/10* (2013.01); *G02B 26/10* (2013.01); *G02F 1/292* (2013.01)

(58) Field of Classification Search
CPC ........ G01S 17/42; G01S 7/4817; G01S 17/10; G01S 17/931; G01S 17/08; G02B 26/10; G02F 1/292; H01Q 23/00
See application file for complete search history.

(56) References Cited

U.S. PATENT DOCUMENTS 7,714,815 B2  5/2010  Kim et al.
9,589,530 B1 *  3/2017  Novoselov ............ G09G 3/348
(Continued)

FOREIGN PATENT DOCUMENTS

CN  107329132 A  11/2017
EP  3 293 569 A1  3/2018
(Continued)

OTHER PUBLICATIONS

Communication dated Feb. 24, 2020, issued by the European Patent Office in counterpart European Application No. 19183920.8.

*Primary Examiner* — Nam D Pham
(74) *Attorney, Agent, or Firm* — Sughrue Mion, PLLC

(57) ABSTRACT

Provided is a beam scanning apparatus including a plurality of antenna resonators disposed two-dimensionally in a row direction and a column direction, a plurality of row voltage lines that are configured to provide a plurality of driving voltages in a row direction, respectively, a plurality of column voltage lines that are configured to provide a plurality of driving voltages in a column direction, respectively, and a driving voltage conversion circuit configured to control a driving voltage applied to each of the plurality of antenna resonators based on a driving voltage in the row direction that is provided from each of the plurality of row voltage lines and a driving voltage in the column direction that is provided from each of the plurality of column voltage lines.

25 Claims, 18 Drawing Sheets

(51) Int. Cl.
*G01S 17/10* (2020.01)
*G02F 1/29* (2006.01)
*G02B 26/10* (2006.01)

(56) References Cited

U.S. PATENT DOCUMENTS 10,096,275 B2   10/2018   Masumura et al.
2019/0079367 A1   3/2019   Park et al.

FOREIGN PATENT DOCUMENTS

| | | |
|---|---|---|
| EP | 3 324 235 A1 | 5/2018 |
| JP | 2009-163060 A | 7/2009 |
| JP | 2017-32974 A | 2/2017 |
| JP | 2017-228829 A | 12/2017 |
| WO | 02/29774 A2 | 4/2002 |

\* cited by examiner

BEAM SCANNING APPARATUS AND OPTICAL APPARATUS INCLUDING THE SAME

CROSS-REFERENCE TO RELATED APPLICATION

This application claims priority from Korean Patent Application No. 10-2018-0136802, filed on Nov. 8, 2018, in the Korean Intellectual Property Office, the disclosure of which is incorporated herein in its entirety by reference.

BACKGROUND

1. Field

Example embodiments of the present disclosure relate to beam scanning apparatuses and optical apparatuses including the beam scanning apparatuses, and more particularly, to non-mechanical beam scanning apparatuses, in which an amount of voltage information needed for operation is reduced, and optical apparatuses including the non-mechanical beam scanning apparatuses.

2. Description of the Related Art

Recently, advanced driving assistance systems (ADAS) with various functions have been commercialized. For example, the number of vehicles is increasing, which are equipped with functions such as an adaptive cruise control (ACC) that recognizes a position and speed of another vehicle and reduces a speed of a corresponding vehicle if the risk of collision is low and drives the corresponding vehicle within a set speed range when there is no risk of collision, or an autonomous emergency braking (AEB) system, which recognizes a preceding vehicle and prevents collision by automatically braking if there is a risk of collision but the driver does not respond to it or if the response method is not appropriate. Also, commercialization of automobiles allowing autonomous driving in the near future is expected.

Accordingly, interest in an optical measuring apparatus capable of providing information about the surroundings of a vehicle is increasing. Light detection and ranging (LiDAR) for vehicles, for example, radiates a laser to a selected area around a vehicle and detects reflected lasers to provide information about distances with respect to objects in the vicinity of the vehicle, or relative speeds and azimuths of the objects. To this end, a LiDAR for vehicles includes a beam scanning apparatus capable of scanning light in a desired area. The beam scanning apparatus may also be used, other than for LiDAR for automobiles, in LiDAR for robots, LiDAR for drones, security-purpose intruder surveillance systems, subway screen door obstacle detection systems, depth sensors, user face recognition sensors in mobile phones, augmented reality (AR), motion recognition and object profiling on TVs or entertainment devices.

The beam scanning apparatus may be classified into a mechanical beam scanning apparatus and a non-mechanical beam scanning apparatus. For example, a mechanical scanning apparatus uses a method of rotating a light source itself, a method of rotating a mirror that reflects light, or a method of moving a spherical lens in a direction perpendicular to an optical axis. A non-mechanical scanning apparatus uses, for example, a method of using a semiconductor device and a method of electrically controlling an angle of reflected light by using a reflective phased array.

SUMMARY

According to an aspect of an example embodiment, there is provided a beam scanning apparatus including a plurality of antenna resonators disposed two-dimensionally in a row direction and a column direction, a plurality of row voltage lines that are configured to provide a plurality of row driving voltages in a row direction, a plurality of column voltage lines that are configured to provide a plurality of column driving voltages in a column direction, and a driving voltage conversion circuit configured to control a driving voltage applied to each of the plurality of antenna resonators based on a row driving voltage that is provided from each of the plurality of row voltage lines and a column driving voltage that is provided from each of the plurality of column voltage lines.

The plurality of row voltage lines may be configured to simultaneously provide the plurality of row driving voltages, and the plurality of column voltage lines are configured to simultaneously provide the plurality of column driving voltages.

Each of the plurality of driving voltages in the row direction and each of the plurality of driving voltages in the column direction may be in a range between 0 volts and a threshold voltage, and wherein the threshold voltage is a voltage at which a phase shift of reflected light by each of the plurality of antenna resonators is at a maximum.

Each of the plurality of driving voltages in the row direction that is provided by each of the plurality of row voltage lines may have a saw-toothed voltage distribution that varies linearly in a cycle in the row direction.

The plurality of row voltage lines may include a first row voltage line providing a first voltage that is between 0 volts and the threshold voltage, a second row voltage line providing a second voltage that is between 0 volts and the threshold voltage, and at least one row voltage line that is disposed between the first row voltage line and the second row voltage line and provides a linearly increasing or decreasing voltage between the first voltage and the second voltage.

Each of the plurality of driving voltages in the column direction that is provided by each of the plurality of column voltage lines may have a saw-toothed voltage distribution that varies linearly in a cycle in a column direction.

The plurality of column voltage lines may include a first column voltage line providing a third voltage that is between 0 V and the threshold voltage, a second column voltage line providing a fourth voltage that is between 0 V and the threshold voltage, and at least one column voltage line that is disposed between the first column voltage line and the second column voltage line and provides a linearly increasing or decreasing voltage between the third voltage and the fourth voltage.

The driving voltage conversion circuit may include a first transformation circuit configured to add a row driving voltage that is provided from a row voltage line corresponding to the driving voltage conversion circuit and a column driving voltage that is provided from a column voltage line corresponding to the driving voltage conversion circuit, a second transformation circuit configured to output an output voltage of the first transformation circuit based on the output voltage of the first transformation circuit being less than a threshold voltage at which a phase shift of reflected light by each of the plurality of antenna resonators is at a maximum, and output a voltage obtained by subtracting the threshold voltage from the output voltage of the first transformation circuit based on the output voltage of the first transformation circuit being greater than the threshold voltage, and a third transformation circuit configured to alter an output voltage of the second transformation circuit according to non-linearity between a voltage applied to each of the plurality of antenna resonators and a phase shift of the reflected light caused by each of the plurality of antenna resonators.

Each of the plurality of antenna resonators may include an electrode layer, an active layer disposed on the electrode layer, an insulating layer disposed on the active layer, and an antenna layer disposed on the insulating layer, and wherein an output of the third transformation circuit is electrically connected to the antenna layer or the electrode layer.

The first transformation circuit may include an op-amp including a first input port, a second input port, and an output port, and the first input port of the op-amp is connected to the row voltage line, the second input port of the op-amp is connected to the column voltage line, and the output port of the op-amp is connected to an input of the second transformation circuit.

The first transformation circuit may further include a first resistor connected to the first input port of the op-amp, a second resistor connected to the second input port of the op-amp, a third resistor connected between the first input port and the output port of the op-amp, and a fourth resistor connected between the second input port of the op-amp and ground.

The second transformation circuit may include a comparison circuit configured to compare the output voltage of the first transformation circuit with the threshold voltage, a first output port configured to output the output voltage of the first transformation circuit without change, a voltage difference circuit configured to output a voltage obtained by subtracting the threshold voltage from the output voltage of the first transformation circuit, a second output port connected to an input port of the third transformation circuit, and a switch connecting the second output port to the first output port or to the voltage difference circuit based on a result of the comparison by the comparison circuit.

The first output port of the second transformation circuit may include an op-amp having a gain of 1.

The voltage difference circuit of the second transformation circuit may include an op-amp that has a gain of 1 and an offset which is a negative threshold voltage.

The third transformation circuit may include an analog-to-digital converter configured to convert the output voltage of the second transformation circuit into the digital signal, a non-linear compensation circuit configured to convert a digital signal provided by the analog-to-digital converter into a digital signal having an inverse functional relationship with a voltage-phase shift function of each of the plurality of antenna resonators, and a digital-to-analog converter configured to convert an output of the non-linear compensation circuit into an analog voltage.

The non-linear compensation circuit may include a predefined lookup table including an input digital signal and an output digital signal.

The beam scanning apparatus may further include two column voltage input lines, a first voltage distributor connected between the two column voltage input lines, the first voltage distributor configured to distribute a voltage at certain voltage intervals, and a plurality of first voltage modulo calculation circuits that are each connected between the plurality of column voltage lines and the first voltage distributor, each of the plurality of first voltage modulo calculation circuits being configured to provide a voltage modulo, that is obtained by dividing a voltage provided from the first voltage distributor by the threshold voltage, to a corresponding column voltage line from among the plurality of column voltage lines.

The first voltage distributor may include a plurality of resistors serially connected between the two column voltage input lines, and a plurality of voltage distribution lines disposed at both ends of each of the plurality of resistors and connected to an input unit of the plurality of first voltage modulo calculation circuits, respectively.

The beam scanning apparatus, wherein all of the plurality of resistors may have an same resistance value.

The beam scanning apparatus may further including two row voltage input lines, a second voltage distributor connected between the two row voltage input lines, the second voltage distributor configured to distribute a voltage at certain voltage intervals, and a plurality of second voltage modulo calculation circuits that are each connected between the plurality of row voltage lines and the second voltage distributor, each of the plurality of second voltage modulo calculation circuits being configured to provide a voltage modulo, that is obtained by dividing a voltage provided from the second voltage distributor by the threshold voltage, to a corresponding row voltage line from among the plurality of row voltage lines.

The second voltage distributor may include a plurality of resistors serially connected between the two row voltage input lines, and a plurality of voltage distribution lines disposed at both ends of each of the plurality of resistors and connected to an input unit of the plurality of second voltage modulo calculation circuits, respectively.

According to another aspect of an example embodiment, there is provided an optical apparatus including a light source configured to emit light, a beam scanning apparatus configured to reflect the light emitted by the light source and electrically control a reflection angle of the reflected light, and an photodetector configured to detect light reflected by an external object that is irradiated with the reflected light from the beam scanning apparatus, wherein the beam scanning apparatus includes a plurality of antenna resonators disposed two-dimensionally in a row direction and a column direction, a plurality of row voltage lines that are configured to provide a plurality of row driving voltages in a row direction, a plurality of column voltage lines that are configured to provide a plurality of column driving voltages in a column direction, and a driving voltage conversion circuit configured to control a driving voltage applied to each of the plurality of antenna resonators based on a row driving voltage that is provided from each of the plurality of row voltage lines and a column driving voltage that is provided from each of the plurality of column voltage lines.

The optical apparatus may further include a controller configured to calculate position information of the external object based on a measurement by the photodetector.

The optical apparatus may include a distance sensor, a three-dimensional sensor, or a vehicle radar.

According to another aspect of an example embodiment, there is provide a beam scanning apparatus including a plurality of antenna resonators disposed two-dimensionally in a row direction and a column direction, a plurality of pixels disposed two-dimensionally in a row direction and a column direction, the plurality of pixels corresponding to the plurality of antenna resonators, respectively, a plurality of row voltage lines that are configured to provide a plurality of driving voltages in a row direction, respectively, a plurality of column voltage lines that are configured to provide a plurality of driving voltages in a column direction, respectively, and a driving voltage conversion circuit configured to control a driving voltage applied to each of the plurality of pixels based on a driving voltage in the row direction that is provided from each of the plurality of row voltage lines and a driving voltage in the column direction that is provided from each of the plurality of column voltage lines, wherein the plurality of pixels are configured to control the driving voltage applied to each of the plurality of antenna resonators

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
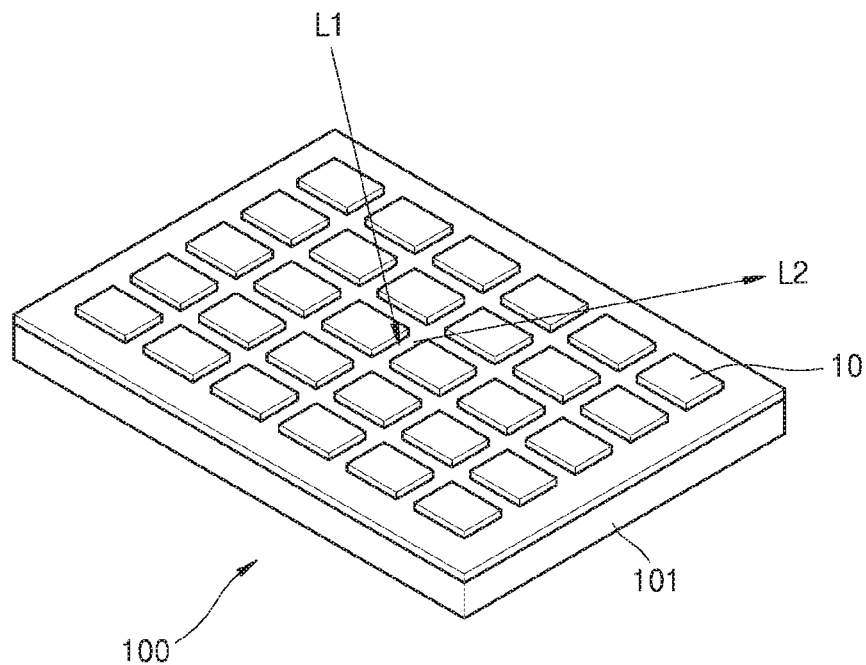
FIG. 1 is a perspective view of a schematic structure of a beam scanning apparatus according to an example embodiment.

Hereinafter, a beam scanning apparatus and an optical apparatus including the beam scanning apparatus will be described in detail with reference to the accompanying drawings. Throughout the drawings, like reference numerals refer to like elements, and each element may be exaggerated in size for clarity and convenience of description. Example embodiments are merely illustrative, and various modifications may be possible. In a layer structure described below, an expression such as "above" or "on" may include not only the meaning of arrangement of an element "immediately on, under or on the left side or on the right side of another element in a contact manner", but also the meaning of arrangement "of an element on, under, on the left side or on the right side of another element in a non-contact manner."

It will be understood that the terms "comprise" or "include" should not be construed as including all elements or steps described in the specification and may omit some elements or some steps or may further include additional elements or steps. While such terms as "first", "second", etc., may be used to describe various components, such components must not be limited to the above terms. The above terms are used only to distinguish one component from another.

As used herein, the term "and/or" includes any and all combinations of one or more of the associated listed items. Expressions such as "at least one of", when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a perspective view of a schematic structure of a beam scanning apparatus 100 according to an example embodiment. Referring to FIG. 1, the beam scanning apparatus 100 according to an example embodiment may include a substrate 101 and a reflective phased array device disposed on the substrate 101 and reflecting incident light L1 and electrically controlling a reflection angle of reflected light L2. The reflective phased array device may include a plurality of antenna resonators 10 that are each independently driven.

The plurality of antenna resonators 10 may be disposed two-dimensionally on the substrate 101 in a row direction and a column direction. While the plurality of antenna resonators 10 are illustrated in FIG. 1 as being disposed two-dimensionally and at regular intervals, example embodiments are not limited thereto, and the plurality of antenna resonators 10 may be disposed irregularly. By controlling a row direction driving voltage applied to the plurality of antenna resonators 10 disposed in a row direction and a column direction driving voltage applied to the plurality of antenna resonators 10 disposed in a column direction, a reflection angle of the reflected light L2 may be controlled two-dimensionally. A driving circuit controlling a driving voltage applied to the plurality of antenna resonators 10 may be disposed inside the substrate 101.

Figure 2:
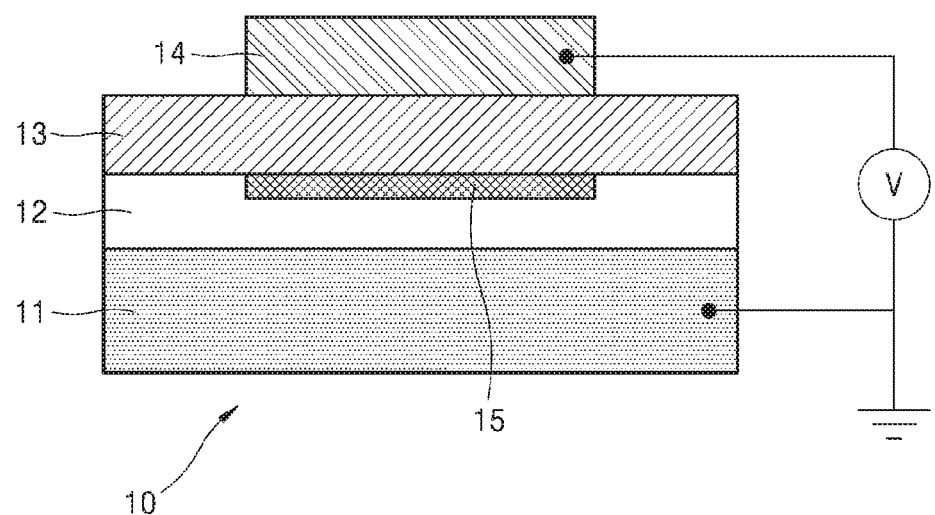
FIG. 2 is a cross-sectional view of a schematic structure of an antenna resonator of the beam scanning apparatus illustrated in FIG. 1.

FIG. 2 is a cross-sectional view of a schematic structure of an antenna resonator 10 of the beam scanning apparatus 100 illustrated in FIG. 1. Referring to FIG. 2, each of the antenna resonators 10 includes an electrode layer 11, an active layer 12 disposed on the electrode layer 11, an insulating layer 13 disposed on the active layer 12, and an antenna layer 14 in nanoscale disposed on the insulating layer 13. Although only one antenna layer 14 is shown in FIG. 2, example embodiments are not limited thereto, and the reflective phased array device including a plurality of antenna resonators 10 may include a plurality of antenna layers 14 disposed on the insulating layer 13 at regular intervals.

The electrode layer 11 is configured to operate as a common electrode and may be formed of a conductive material. The electrode layer 11 may also be formed of a material that reflects incident light to be scanned. For example, the electrode layer 11 may be formed of a metal such as copper (Cu), aluminum (Al), nickel (Ni), iron (Fe), cobalt (Co), zinc (Zn), titanium (Ti), ruthenium (Ru), rhodium (RH), palladium (Pd), platinum (Pt), silver (Ag), osmium (Os), iridium (Ir), gold (Au) or an alloy thereof, or include a metal nano-particle-dispersed thin film of gold (Au) or silver (Ag). In addition, the electrode layer 11 may also include a carbon nanostructure or a conductive polymer material, other than metals.

The antenna layer 14 is configured to operate as an antenna with respect to light, generate localized surface plasmon resonance with respect to light of a predefined wavelength, and capture and discharge energy thereof. Surface plasmon resonance is a phenomenon in which a very high electric field is generated locally on a metal surface due to collective oscillation of free electrons in a metal when light is incident on the metal. Surface plasmon resonance may occur at an interface between metal and non-metal. To this end, the antenna layer 14 may be formed of a metal material having relatively high conductivity, such as gold (Au), silver (Ag), copper (Cu), aluminum (Al), or platinum (Pt). A size and shape of the antenna layer 14 may vary depending on a wavelength of incident light. For example, a size of the antenna layer 14 may be less than a wavelength of incident light to be scanned, that is, an operating wavelength. For example, when an operating wavelength is visible light or near-infrared light, a width or length of the antenna layer 14 may be about 400 nm or less. In addition, while the antenna layer 14 may have a simple rod shape, it may also have various patterns such as a circular, elliptical, or cross shape.

The insulating layer 13 electrically insulates the antenna layer 14 from the active layer 12 and the electrode layer 11. For example, the insulating layer 13 may be an oxide film such as hafnium oxide ($HfO_2$), silicon oxide ($SiO_2$), aluminum oxide ($Al_2O_3$), titanium oxide ($TiO_2$), zirconium oxide (ZrO), or the like, or a nitride film such as silicon nitride (SiNx).

The active layer 12 is configured to change resonance characteristics of the antenna layer 14 as a charge density within the active layer 12 is changed by an electric signal, for example, an electric field formed between the electrode layer 11 and the antenna layer 14. In other words, a charge accumulation layer or a depletion layer 15 is formed in the active layer 12 by the electric field formed between the electrode layer 11 and the antenna layer 14 to change resonance conditions and thereby change a phase of the reflected light L2. The active layer 12 may be formed of a material selected from the group consisting of crystalline materials such as potassium tantalate niobate (KTN), lithium niobium oxide ($LiNbO_3$), and lead zirconate titanate (PZT), ZnO-based materials such as indium tin oxide (ITO), indium zinc oxide (IZO), aluminum zinc oxide (AZO), gallium zinc oxide (GZO), or gallium indium zinc oxide (GIZO), transition metal nitrides such as titanium nitride (TiN), zirconium nitride (ZrN), hafnium nitride (HfN) or tantalum nitride (TaN), and semiconductor materials such as Si, a-Si, or a Group III-V compound semiconductor.

In the beam scanning apparatus 100 according to the example embodiment, a charge density within the active layer 12 varies according to an intensity of an electrical field between the electrode layer 11 and the antenna layer 14. As a common voltage is applied to the electrode layer 11, particularly according to a distribution of a voltage applied to a plurality of antenna layers 114, a charge density distribution in the active layer 12 may vary. Variation in the charge density in the active layer 12 may modify resonance characteristics of the antenna layer 14, and the modified resonance characteristics may cause phase shift of light reflected by each antenna layer 14, thereby varying a phase of light reflected by each antenna layer 14. Accordingly, as a phase shift distribution of the reflected light L2 reflected by the reflective phased array device is determined based on a distribution of a voltage applied to the plurality of antenna layers 14 disposed adjacent to each other, a travelling direction of the reflected light L2 may be controlled by controlling a voltage applied to the plurality of antenna layers 14. The beam scanning apparatus 100 may reflect incident light in the above-described manner to scan the reflected light L2 in a desired direction.

Figure 3:
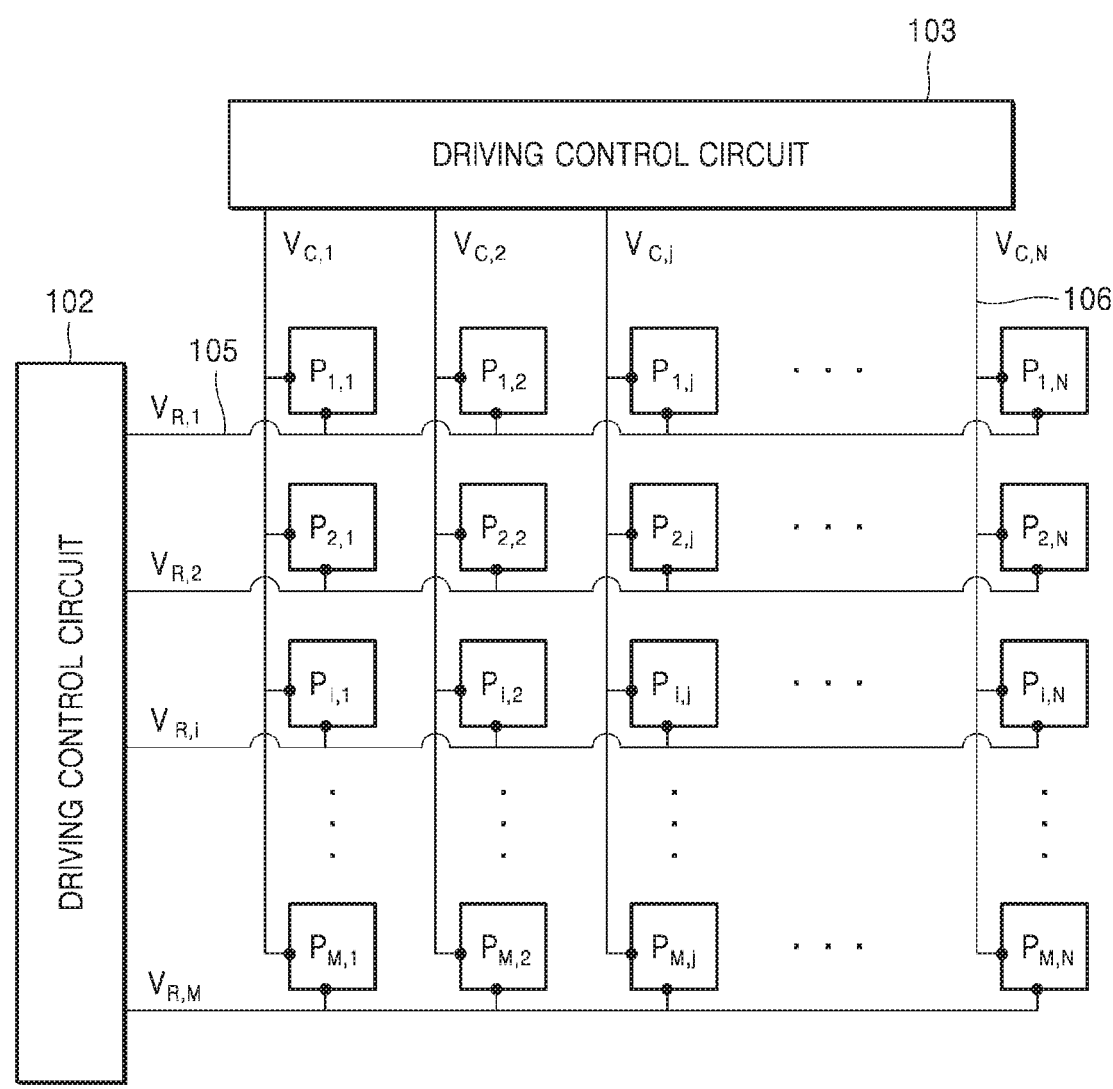
FIG. 3 is a circuit diagram of a structure of a driving circuit of the beam scanning apparatus illustrated in FIG. 1.

The beam scanning apparatus 100 may include a driving circuit to independently control a voltage applied to the plurality of antenna resonators 10 disposed two-dimensionally. For example, FIG. 3 is a circuit diagram of a schematic structure of a driving circuit of the beam scanning apparatus 100 illustrated in FIG. 1. Referring to FIG. 3, the beam scanning apparatus 100 may include a plurality of row voltage lines 105 each providing a driving voltage $V_R$ in a row direction, a plurality of column voltage lines 106 each providing a driving voltage $V_C$ in a column direction, a row direction driving control circuit 102 applying a driving voltage to each of the plurality of row voltage lines 105, a column direction driving control circuit 103 applying a driving voltage to each of the plurality of column voltage lines 106, and a plurality of pixels P disposed two-dimensionally in a row direction and a column direction.

The row direction driving control circuit 102 may simultaneously apply a driving voltage to each of the plurality of row voltage lines 105. In response, the plurality of row voltage lines 105 may simultaneously provide row direction driving voltages $V_R$ to rows of the plurality of pixels P, respectively. In addition, the column direction driving control circuit 103 may simultaneously apply a driving voltage to each of the plurality of column voltage lines 106. In response, the plurality of column voltage lines 106 may simultaneously provide column direction driving voltages $V_C$ to columns of the plurality of pixels P, respectively.

Figure 4:
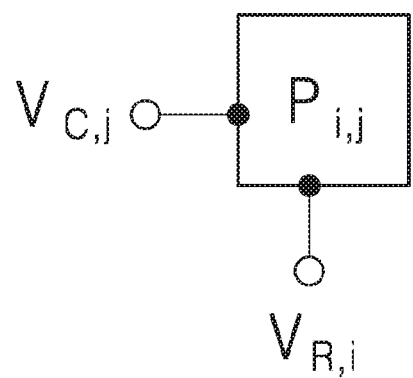
FIG. 4 schematically illustrates an electrical connection structure of a pixel illustrated in the circuit diagram of FIG. 3.

FIG. 4 schematically illustrates an electrical connection of a pixel P illustrated in the circuit diagram of FIG. 3. Referring to FIG. 4, to one pixel P, one row voltage line 105 and one column voltage line 106 respectively corresponding to a row and a column in which the pixel P is disposed may be electrically connected. For example, to a pixel Pij disposed in an ith row and a jth column, an ith row voltage line 105 and a jth column voltage line 106 may be electrically connected.

Figure 5:
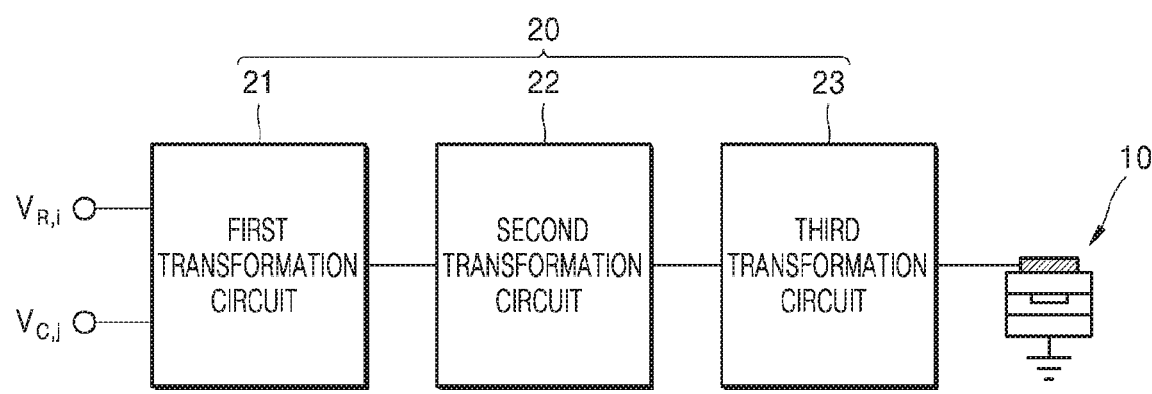
FIG. 5 schematically illustrates a circuit structure of a pixel illustrated in FIG. 4.

A voltage applied to one antenna resonator 10 may be determined based on a row direction driving voltage $V_R$ and a column direction driving voltage $V_C$ provided to a pixel P corresponding to the antenna resonator 10. A pixel P may control a driving voltage applied to each of the antenna resonators 10 based on a row direction driving voltage $V_R$ provided from each of the row voltage lines 105 and a column direction driving voltage $V_C$ provided from each of the column voltage lines 106. For example, FIG. 5 schematically illustrates a circuit structure of a pixel P illustrated in FIG. 4 Referring to FIG. 5, each pixel P may include a driving voltage conversion circuit 20 that controls a driving voltage applied to each of the antenna resonators 10 based on a row direction driving voltage $V_R$ provided from each of the row voltage lines 105 and a column direction driving voltage $V_C$ provided from each of the column voltage lines 106.

Each driving voltage conversion circuit 20 may include a first transformation circuit 21, a second transformation circuit 22, and a third transformation circuit 23 that are sequentially disposed. First, a row direction driving voltage $V_R$ and a column direction driving voltage $V_C$ are applied to an input port of the first transformation circuit 21. An output of the first transformation circuit 21 is applied to an input port of the second transformation circuit 22, and an output of the second transformation circuit 22 is applied to an input port of the third transformation circuit 23. Finally, an output of the third transformation circuit 23 is applied to the antenna resonator 10. For example, an output of the third transformation circuit 23 may be applied to an antenna layer 14 of the antenna resonator 10, and the electrode layer 11 may be grounded. Alternatively, according to an example embodiment, an output of the third transformation circuit 23 may be applied to the electrode layer 11 of the antenna resonator 10, and the antenna layer 14 may be grounded.

The first transformation circuit 21 is configured to add a row direction driving voltage $V_{R,i}$ provided from a row voltage line 105 corresponding to the pixel Pij and a column direction driving voltage $V_{C,j}$ provided from a column voltage line 106 corresponding to the pixel Pij. In other words, the first transformation circuit 21 is a voltage sum circuit. Accordingly, an output of the first transformation circuit 21 is equal to a sum $(V_{R,i}+V_{C,j})$ of the row direction driving voltage $V_{R,i}$ and the column direction driving voltage $V_{C,j}$. An output of the first transformation circuit 21 may be expressed by Equation 1 below.

$$V^{\Sigma}_{i,j} = V_{R,i} + V_{C,j}$$ Equation 1

Figure 6:
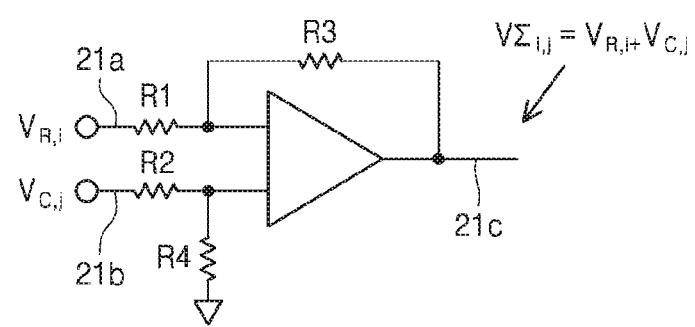
FIG. 6 is a circuit diagram of a structure of a first transformation circuit illustrated in FIG. 5.

For example, FIG. 6 is a circuit diagram of a structure of the first transformation circuit 21 illustrated in FIG. 5. Referring to FIG. 6, the first transformation circuit 21 may include an operational amplifier (op-amp) including two input ports 21a and 21b and one output port 21c. From among the input ports 21a and 21b of the op-amp, the first input port 21a may be connected to the row voltage line 105, and the second input port 21b may be connected to the column voltage line 106. The output port 21c of the op-amp may be connected to an input port of the second transformation circuit 22. In addition, the first transformation circuit 21 may further include a first resistor R1 connected to the first input port 21a of the op-amp, a second resistor R2 connected to the second input port 21b of the op-amp, a third resistor R3 connected between the first input port 21a and the output port 21c of the op-amp, and a fourth resistor R4 connected between the second input port 21b of the op-amp and ground. The first through fourth resistors R1, R2, R3, and R4 may have equal resistance values.

The second transformation circuit 22 may compare an output voltage of the first transformation circuit 21 with a certain preset threshold voltage, and when the output voltage of the first transformation circuit 21 is lower than a threshold voltage, the second transformation circuit 22 outputs the output voltage of the first transformation circuit 21 without change. In addition, the second transformation circuit 22 may compare an output voltage of the first transformation circuit 21 with a certain preset threshold voltage, and when the output voltage of the first transformation circuit 21 is greater than a threshold voltage, the second transformation circuit 22 may output a voltage obtained by subtracting the threshold voltage from the output voltage of the first transformation circuit 21. In other words, the second transformation circuit 22 may be regarded as a voltage modulo circuit that outputs a value obtained as a remainder value after dividing an output voltage of the first transformation circuit 21 by a threshold voltage.

Here, the threshold voltage may be a voltage at which each of the antenna resonators 10 alters a phase of reflected light to the maximum. In general, as a voltage applied to the antenna resonator 10 increases, a phase shift of reflected light caused by the antenna resonator 10 increases. However, when a voltage applied to the antenna resonator 10 is equal to or greater than the threshold voltage value, the antenna resonator 10 may be saturated and a phase shift of the reflected light may not increase anymore. That is, a voltage value corresponding to a point where the phase shift of the reflected light does not increases anymore is a threshold voltage.

Figure 7:
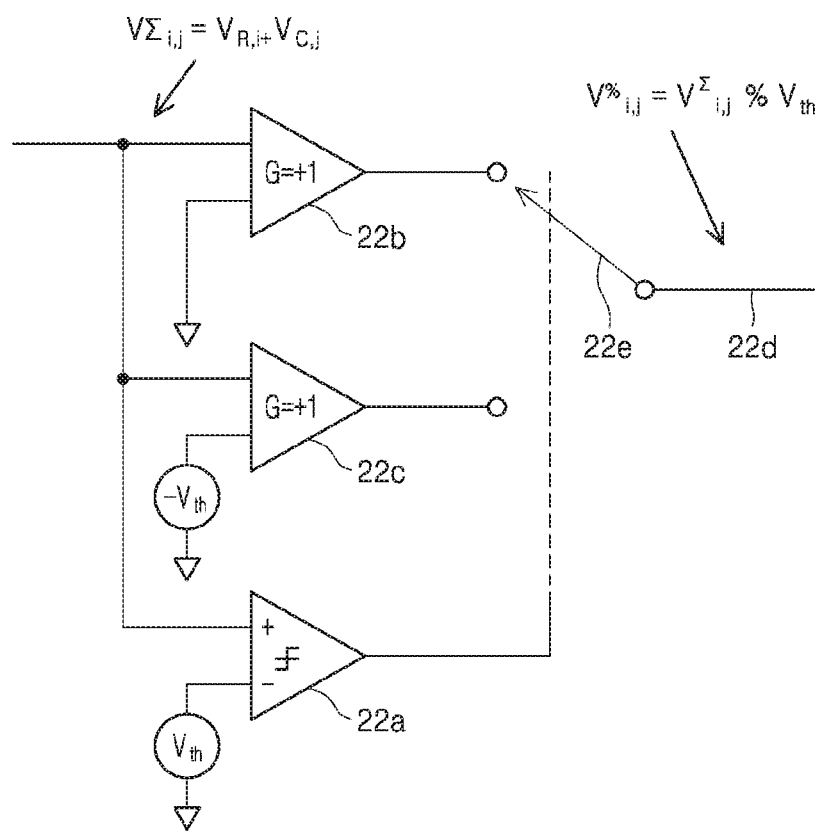
FIG. 7 is a circuit diagram of a structure of a second transformation circuit illustrated in FIG. 5.

For example, FIG. 7 is a circuit diagram of a structure of the second transformation circuit 22 illustrated in FIG. 5. Referring to FIG. 7, the second transformation circuit 22 may include a comparison circuit 22a comparing an output voltage of the first transformation circuit 21 with a threshold voltage $V_{th}$, a first output port 22b via which the output voltage of the first transformation circuit 21 is output without change, and a voltage difference circuit 22c outputting a voltage obtained by subtracting the threshold voltage $V_{th}$ from the output voltage of the first transformation circuit 21. For example, the first output port 22b of the second transformation circuit 22 may be an op-amp having a gain of 1. In addition, the voltage difference circuit 22c of the second transformation circuit 22 may be an op-amp that has a gain of 1 and an offset which is a negative (−) threshold voltage $(-V_{th})$.

In addition, the second transformation circuit 22 may include a second output port 22d connected to the input port of the third transformation circuit 23 and a switch 22e that connects the second output port 22d to the first output port 22b or connects the second output port 22d to the voltage difference circuit 22c based on a result of comparing the output voltage of the first transformation circuit 21 with the threshold voltage $V_{th}$ performed using the comparison circuit 22a. For example, when an output voltage of the first transformation circuit 21 is equal to or lower than a threshold voltage $V_{th}$, the switch 22e may connect the second output port 22d to the first output port 22b. Thus, when an output voltage of the first transformation circuit 21 is equal to or lower than a threshold voltage $V_{th}$, the output voltage of the first transformation circuit 21 is an output voltage of the second transformation circuit 22 without change. When an output voltage of the first transformation circuit 21 is greater than a threshold voltage $V_{th}$, the switch 22e may connect the second output port 22d to the voltage difference circuit 22c. Thus, when an output voltage of the first transformation circuit 21 is greater than the threshold voltage $V_{th}$, the output voltage of the second transformation circuit 22 becomes a voltage obtained after subtracting the threshold voltage $V_{th}$ from the output voltage of the first transformation circuit 21. An output of the second transformation circuit 22 may be expressed by Equation 2 below.

$$V_{i,j}^{\%} = V_{i,j}^{\Sigma} \% V_{th} \qquad \text{Equation 2}$$
$$= \begin{cases} V_{i,j}^{\Sigma} & (V_{i,j}^{\Sigma} = < V_{th}) \\ V_{i,j}^{\Sigma} - V_{th} & (V_{i,j}^{\Sigma} > V_{th}) \end{cases}$$

Figure 8:
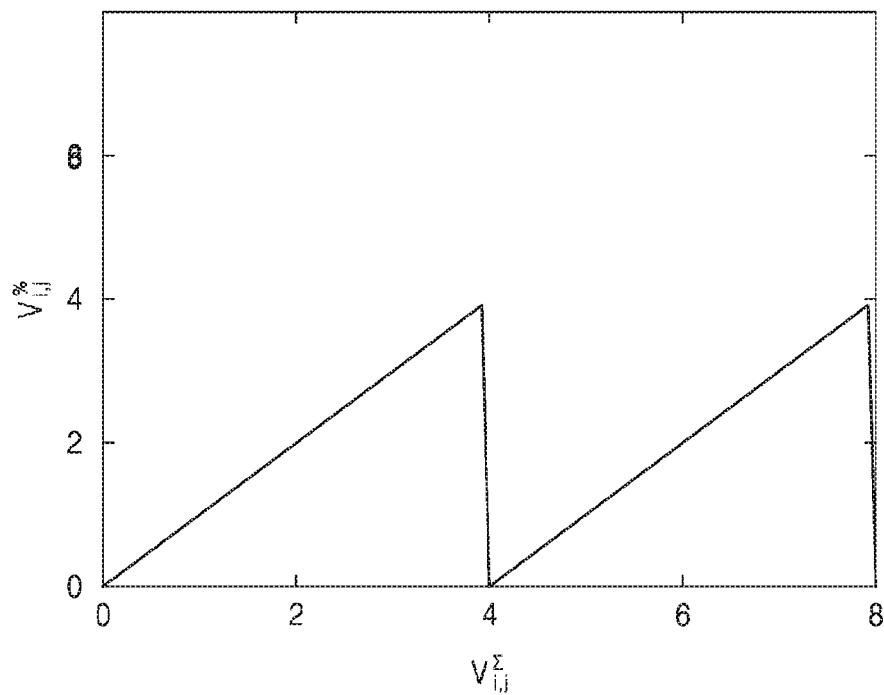
FIG. 8 is a graph showing a relationship between an input voltage and an output voltage in a second transformation circuit illustrated in FIG. 5.

FIG. 8 is a graph showing a relationship between an input voltage and an output voltage in a second transformation circuit 22. In FIG. 8, the threshold voltage $V_{th}$ is assumed to be 4 V. Referring to FIG. 8, at an input voltage of the second transformation circuit 22 from 0 V to 4 V, an output voltage of the second transformation circuit 22 is equal to an input voltage of the second transformation circuit 22. However, at the instant when the input voltage of the second transformation circuit 22 is greater than 4 V, the output voltage of the second transformation circuit 22 decreases abruptly to nearly 0 V. Thus, an output voltage distribution of the second transformation circuit 22 may have a saw-toothed voltage distribution.

Figure 9:
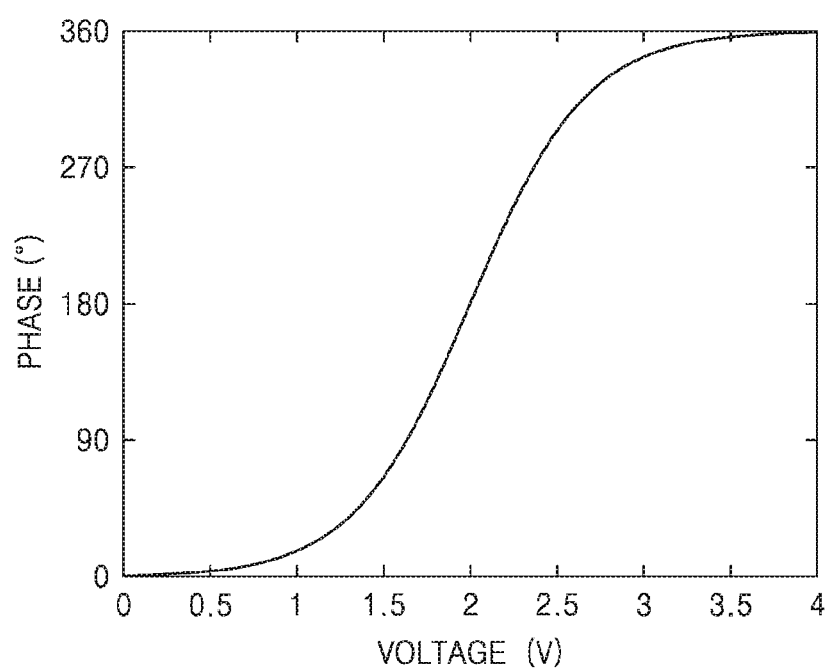
FIG. 9 is a graph showing a relationship between a voltage applied to an antenna resonator and a phase shift of reflected light caused by the antenna resonator.

The third transformation circuit 23 has a function of altering an output voltage of the second transformation circuit 22 by considering non-linearity between a voltage applied to the antenna resonator 10 and a phase shift of reflected light caused by the antenna resonator 10. In general, the greater a voltage applied to the antenna resonator 10, the greater the phase shift of reflected light caused by the antenna resonator 10. However, a relationship between an applied voltage and a phase shift is not linear. For example, FIG. 9 shows a graph of a relationship between a voltage applied to the antenna resonator 10 and a phase shift of reflected light caused by the antenna resonator 10. Referring to FIG. 9, in a voltage section between about 1 V and about 3 V, an inclination of the phase shift is relatively large. However, in a voltage section between 0 V and about 1 V and a voltage section between about 3 V and about 4 V, an inclination of the phase shift is relatively small. Thus, when an output voltage of the second transformation circuit 22 is applied to the antenna resonator 10, a phase of reflected light may differ from a target phase.

Figure 10:
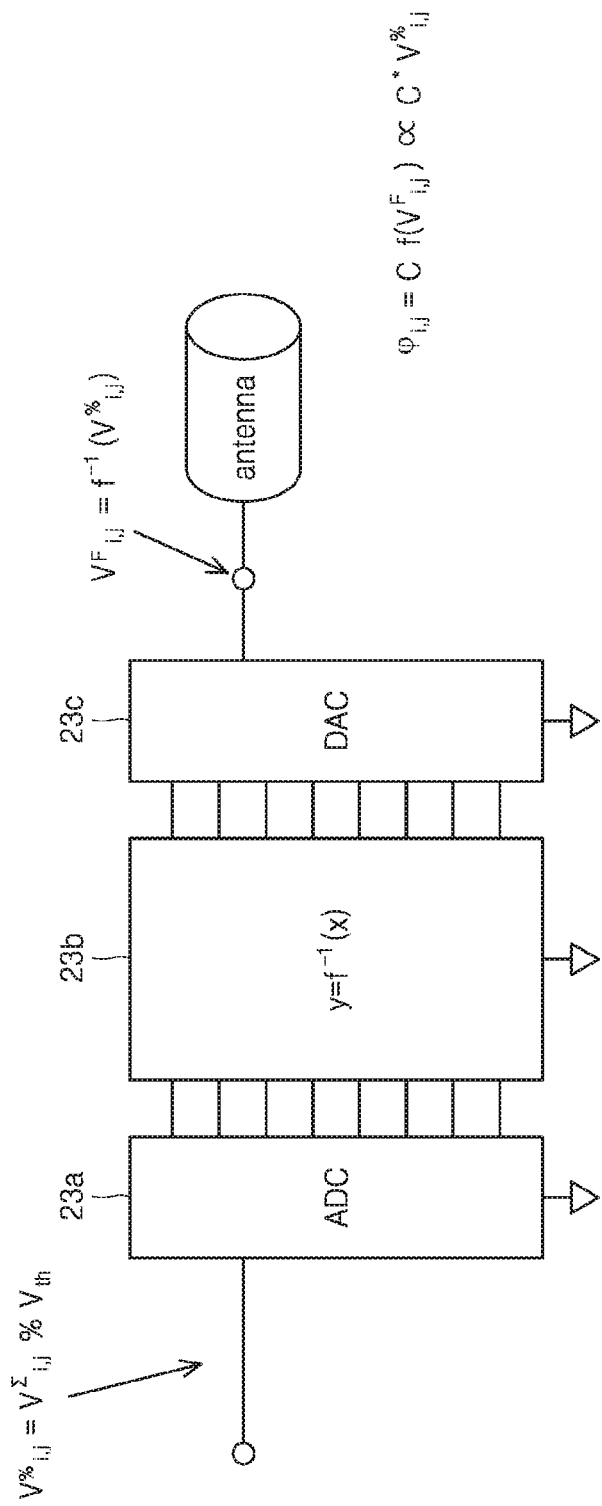
FIG. 10 is a schematic block diagram of a structure of a third transformation circuit illustrated in FIG. 5.

FIG. 10 is a schematic block diagram of a structure of the third transformation circuit 23 illustrated in FIG. 5. Referring to FIG. 10, the third transformation circuit 23 may include an analog-to-digital converter 23a, a non-linear compensation circuit 23b, and a digital-to-analog converter 23c that are sequentially disposed. When an operation of the non-linear compensation circuit 23b is implemented via a typical analog circuit, the non-linear compensation circuit 23b may have a relatively complicated structure. On the other hand, when using a digital method, an operation of the non-linear compensation circuit 23b may be implemented relatively easily. Thus, according to the example embodiment, the non-linear compensation circuit 23b may be configured to have a digital configuration. The analog-to-digital converter 23a is configured to convert an analog output voltage of the second transformation circuit 22 to a digital signal to provide the digital signal to the non-linear compensation circuit 23b. In addition, the digital-to-analog converter 23c is configured to convert a digital output signal of the non-linear compensation circuit 23b to an analog voltage and apply the analog voltage to the antenna resonator 10.

Figure 11:
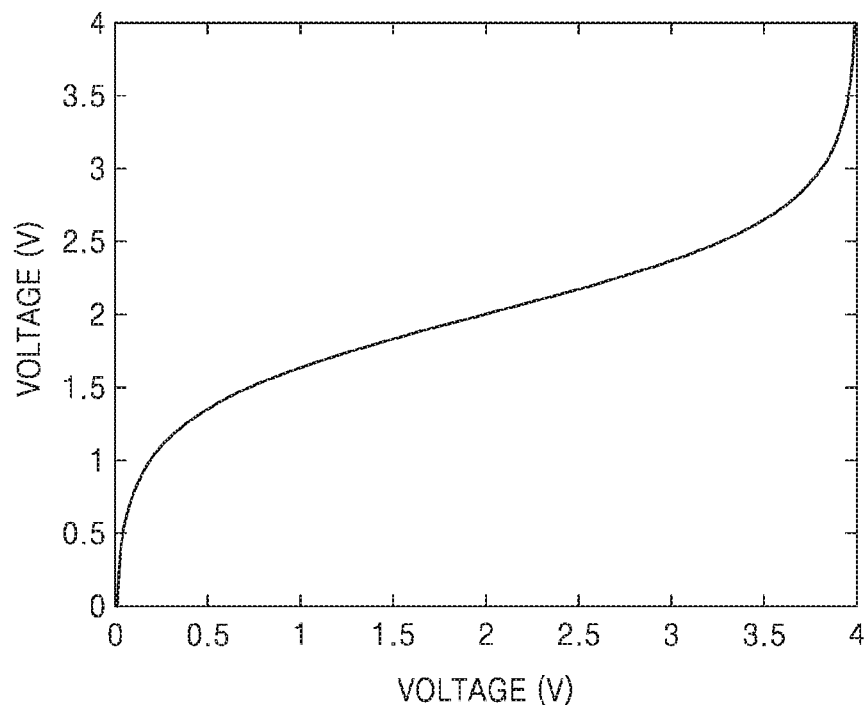
FIG. 11 is a graph showing a relationship between an input voltage and an output voltage in a third transformation circuit illustrated in FIG. 5.
Figure 12:
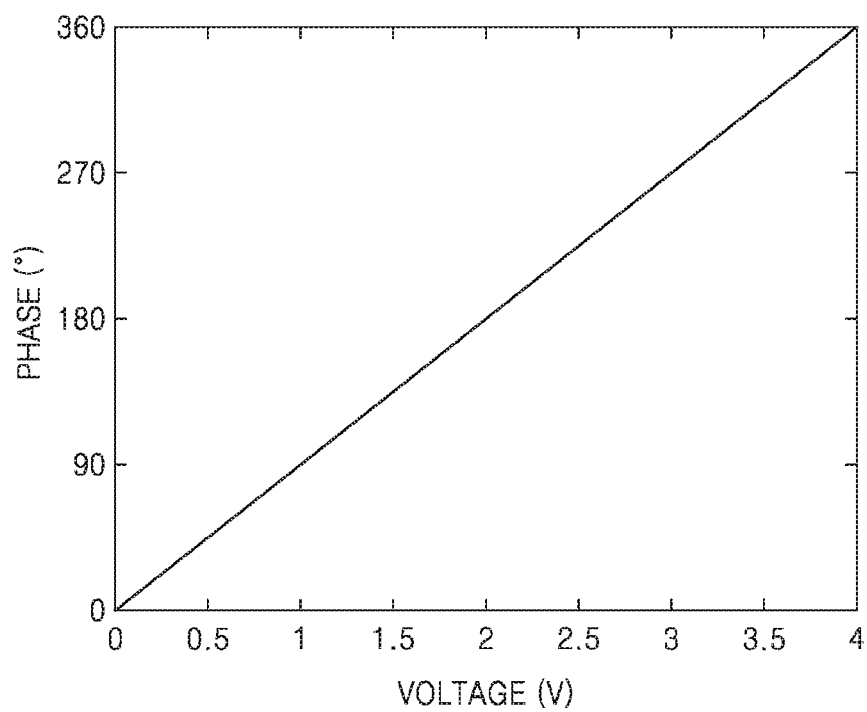
FIG. 12 is a graph showing a relationship between an input voltage of a third transformation circuit and a phase shift caused by the antenna resonator.

The non-linear compensation circuit 23b is configured to convert a digital signal provided by the analog-to-digital converter 23a to a digital signal having an inverse functional relationship to a voltage-phase shift function of the antenna resonator 10. For example, FIG. 11 is a graph showing a relationship between an input voltage and an output voltage in the third transformation circuit 23. The graph illustrated in FIG. 11 is in an inverse functional relationship with, for example, the graph that is illustrated in FIG. 9 and shows a relationship between a voltage applied to the antenna resonator 10 and a phase shift of reflected light caused by the antenna resonator 10. By altering a voltage via the non-linear compensation circuit 23b as described above, a linear relationship between an input voltage of the third transformation circuit 23, that is, an output voltage of the second transformation circuit 22, and a phase shift caused by the antenna resonator 10 may be obtained. For example, FIG. 12 is a graph showing a relationship between an input voltage of the third transformation circuit 23 and a phase shift caused by the antenna resonator 10.

The non-linear compensation circuit 23b may include a memory in which the functional relationship between an input voltage and an output voltage in the third transformation circuit 23 illustrated in FIG. 11 is recorded. For example, the memory may store a predefined lookup table with respect to an input digital signal and an output digital signal according to the functional relationship illustrated in FIG. 11. The non-linear compensation circuit 23b may search the lookup table by using an input digital signal provided by the analog-to-digital converter 23a, to obtain a converted output digital signal. Next, the non-linear compensation circuit 23b may output the converted digital signal. Finally, the digital-to-analog converter 23c may apply a converted analog voltage to the antenna resonator 10.

Figure 13:
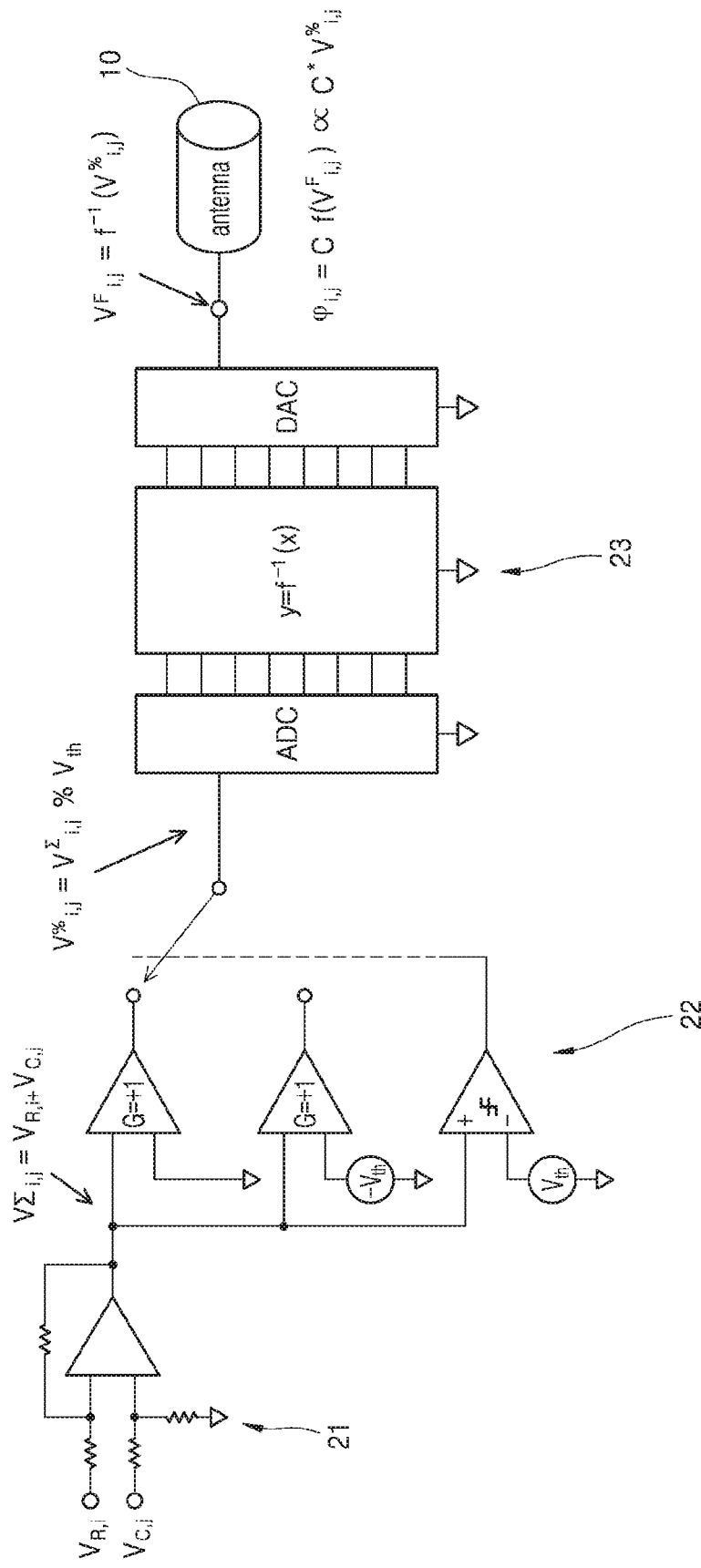
FIG. 13 illustrates a circuit structure of a pixel.

FIG. 13 is a circuit diagram of an example of a circuit structure of a pixel P. Referring to FIG. 13, a pixel P may include a first transformation circuit 21 including one op-amp, a second transformation circuit 22 including two op-amps and one comparator, and a third transformation circuit 23 including an analog-to-digital converter, a digital operator, and a digital-to-analog converter. However, the circuit structure described above is an example, and the operations of the first transformation circuit 21, the second transformation circuit 22, and the third transformation circuit 23 may also be implemented using other various circuits.

Figure 14:
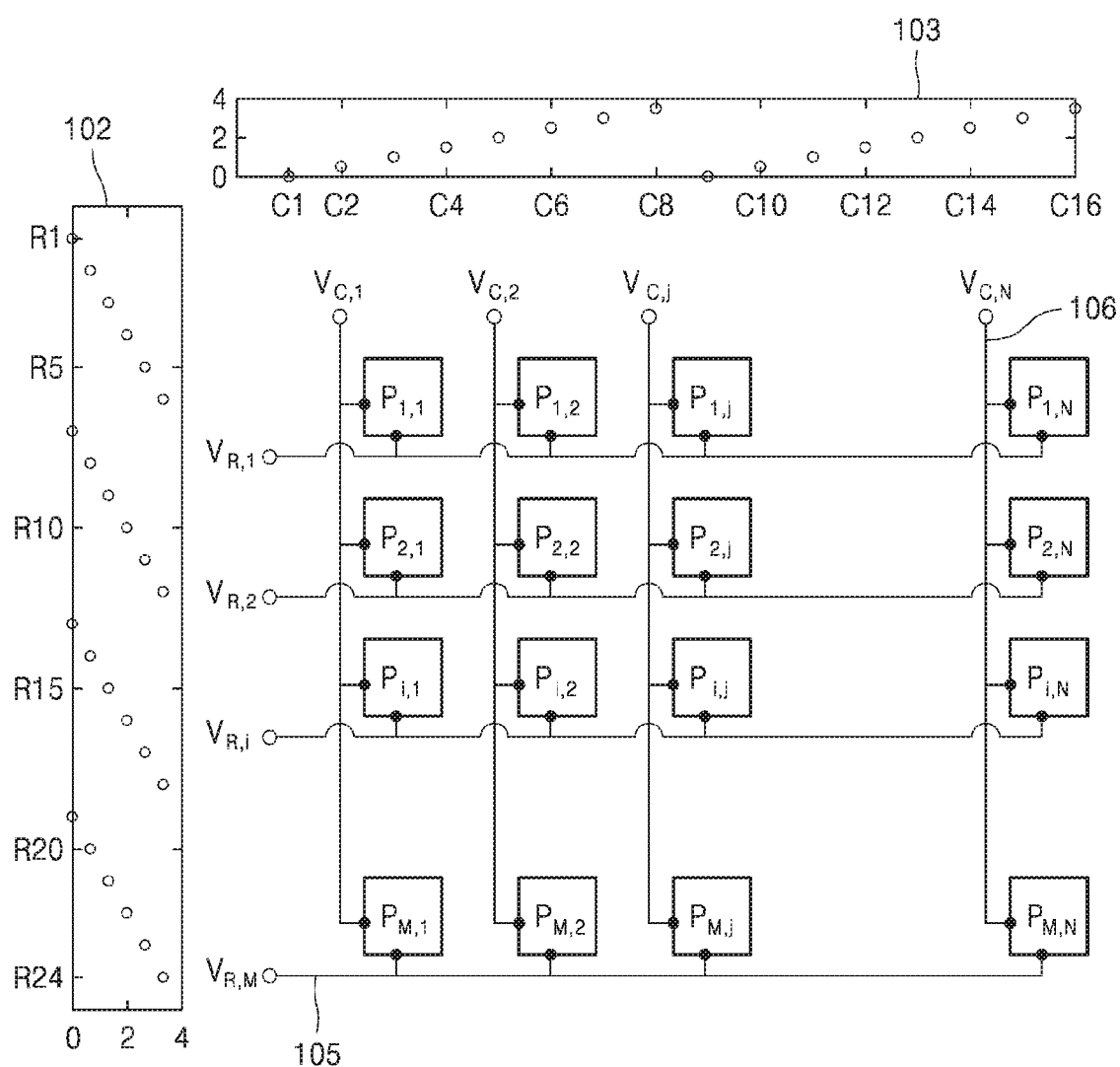
FIG. 14 illustrates pieces of voltage information respectively input in a row direction and a column direction of a beam scanning apparatus according to an example embodiment.

FIG. 14 illustrates pieces of voltage information respectively input in a row direction and a column direction of the beam scanning apparatus 100 according to an example embodiment. For example, FIG. 14 illustrates an example in which a voltage is applied to a phased array device including 24 rows and 16 columns. Referring to FIG. 14, a row direction driving voltage $V_R$ and a column direction driving voltage $V_C$ are in a range between 0 V and a threshold voltage. For example, in the example of FIG. 14, a threshold voltage is 4 V. A plurality of row voltage lines 105 simultaneously provide a plurality of row direction driving voltage $V_R$ having a certain voltage distribution, to a plurality of pixels P according to a direction in which the beam scanning apparatus 100 intends to scan reflected light. At the same time, a plurality of column voltage lines 106 simultaneously provide a plurality of column direction driving voltage $V_C$ having a certain voltage distribution to a plurality of pixels P according to a direction in which the beam scanning apparatus 100 intends to scan reflected light.

Figure 15A:
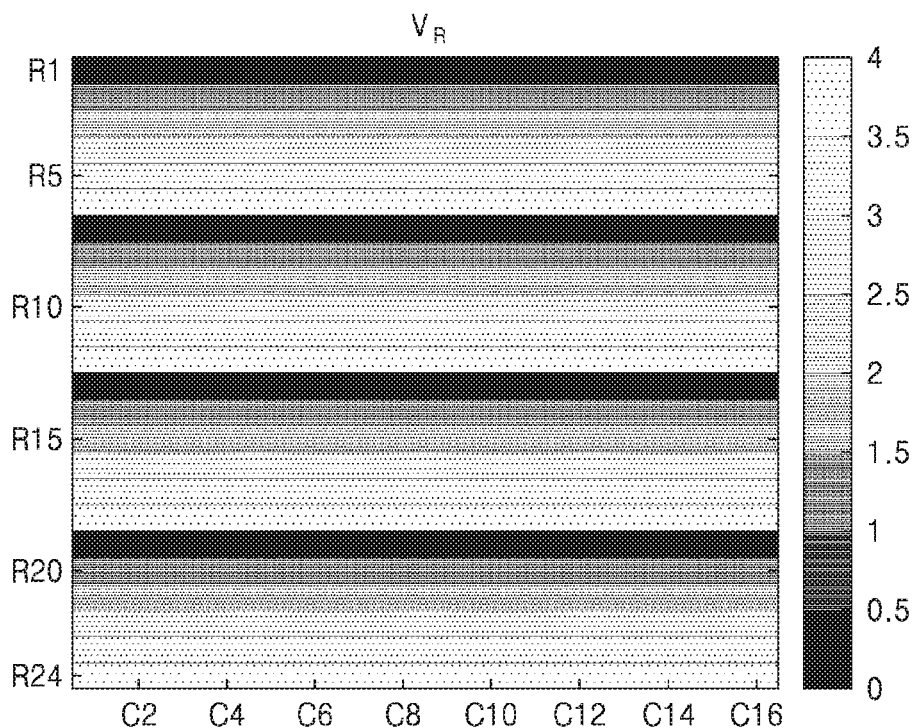
FIG. 15A illustrates a distribution plot of voltages provided in a row direction.
Figure 15B:
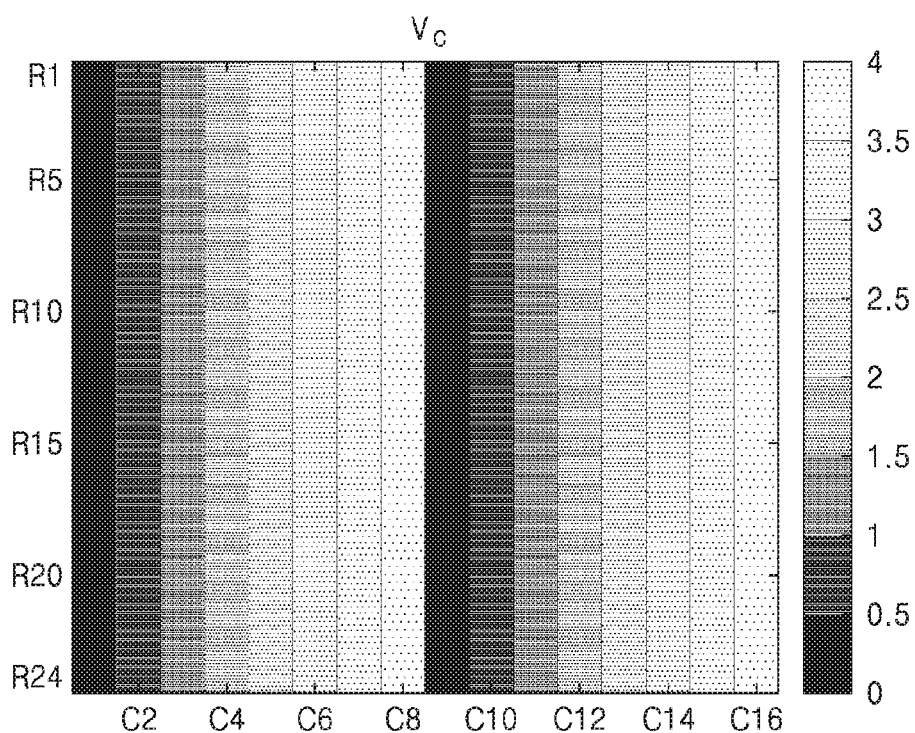
FIG. 15B illustrates a distribution plot of voltages provided in a column direction according to an example embodiment.

The row direction driving voltages $V_R$ that are simultaneously provided via the plurality of row voltage lines 105 have a saw-toothed voltage distribution that linearly varies in a certain cycle in a row direction. For example, FIG. 15A illustrates a distribution plot of voltages provided in a row direction, and FIG. 15B illustrates a distribution plot of voltages provided in a column direction. Referring to FIG. 15A, row direction driving voltages $V_R$ that increase sequentially from 0 V to 4 V in a row direction in the first six rows may be provided to pixels P, and in the next six rows, row direction driving voltages $V_R$ that increase sequentially from 0 V to 4 V in a row direction may be provided again to the pixels P. In addition, referring to FIG. 15B, a column direction driving voltage $V_C$ that is simultaneously provided via the plurality of column voltage lines 106 has a saw-toothed voltage distribution that linearly varies in a certain cycle in a column direction. For example, column direction driving voltages $V_C$ that increase sequentially from 0 V to 4 V in a column direction in the first eight columns may be provided to pixels P, and in the next eight columns, column direction driving voltages $V_C$ that increase sequentially from 0 V to 4 V in a column direction may be provided again to the pixels P.

However, a distribution of the row direction driving voltage $V_R$ and a distribution of the column direction driving voltage $V_C$ illustrated in FIGS. 15A and 15B are merely examples, and a distribution of the row direction driving voltage $V_R$ and a distribution of the column direction driving voltage $V_C$ may be varied according to a direction in which the beam scanning apparatus 100 is to scan reflected light. For example, the number of the row voltage lines 105 and the number of the column voltage lines $V_C$ in a cycle of a driving voltage distribution and a size of a maximum voltage and a size of a minimum voltage in a cycle of a driving voltage distribution may be varied according to a direction in which the beam scanning apparatus 100 is to scan reflected light. The distribution of the row direction driving voltage $V_R$ may be determined using the row direction driving control circuit 102 based on an angle at which the beam scanning apparatus 100 is to reflect light in a vertical direction. The distribution of the column direction driving voltage $V_C$ may also be determined using the column direction driving control circuit 103 based on an angle at which the beam scanning apparatus 100 is to reflect light in a horizontal direction.

For example, during a cycle of a row direction driving voltage distribution, an initial row voltage line 105 may provide a maximum voltage (or a minimum voltage) between 0 V and a threshold voltage to a pixel P, and a last row voltage line 105 may provide a minimum voltage (or a maximum voltage) between 0 V and the threshold voltage to the pixel P. In addition, within a cycle of a row direction driving voltage distribution, row voltage lines 105 between the initial row voltage line 105 and the last row voltage line 105 may provide, to the pixels P, a linearly increased or reduced voltage between a maximum voltage and a minimum voltage (or between a minimum voltage and a maximum voltage). Likewise, within a cycle of a column direction driving voltage distribution, a initial column voltage line 106 may provide a maximum voltage (or a minimum voltage) that is between 0 V and a threshold voltage, to a pixel P, and a last column voltage line 106 may provide a minimum voltage (or a maximum voltage) that is between 0 V and the threshold voltage, to the pixel P. In addition, during a cycle of a column direction driving voltage distribution, column voltage lines 106 disposed between the initial column voltage line 106 and the last column voltage line 106 may provide, to the pixels P, a linearly increased or reduced voltage between a maximum voltage and a minimum voltage (or between a minimum voltage and a maximum voltage).

According to the example embodiment, the number of pieces of driving voltage information needed to drive the beam scanning apparatus 100 may be a sum of the number of rows and the number of columns. In the example embodiment of FIG. 14 illustrating 24 rows and 16 columns, the number of the pixels P is 24×16=384, and, the 384 pixels P may be driven using just 24+16=40 pieces of driving voltage information.

Figure 16A:
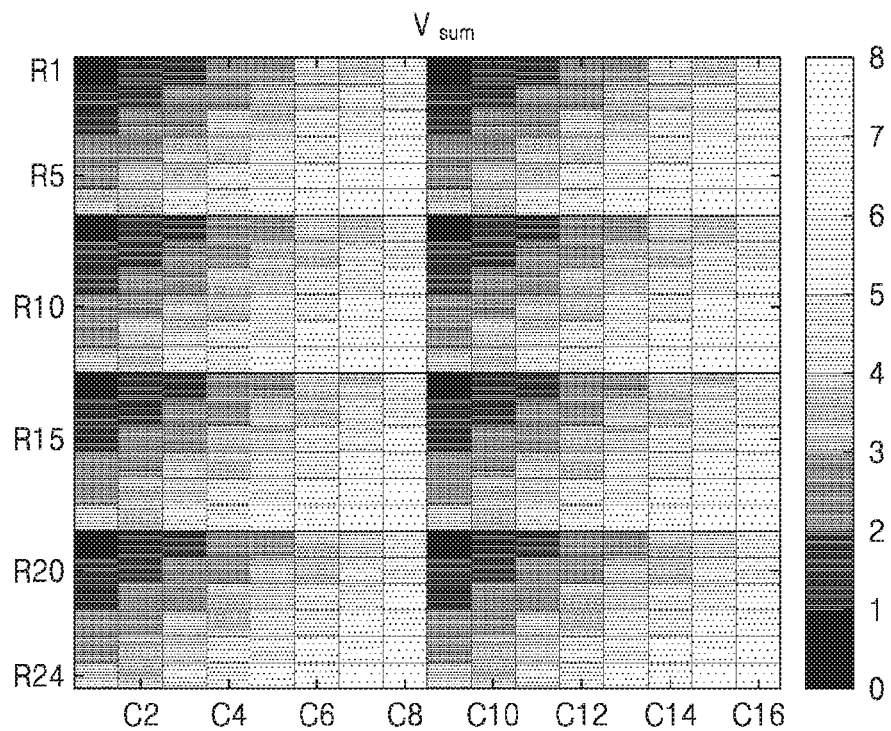
FIG. 16A is a distribution plot of voltages output via first transformation circuits of a plurality of pixels.
Figure 16B:
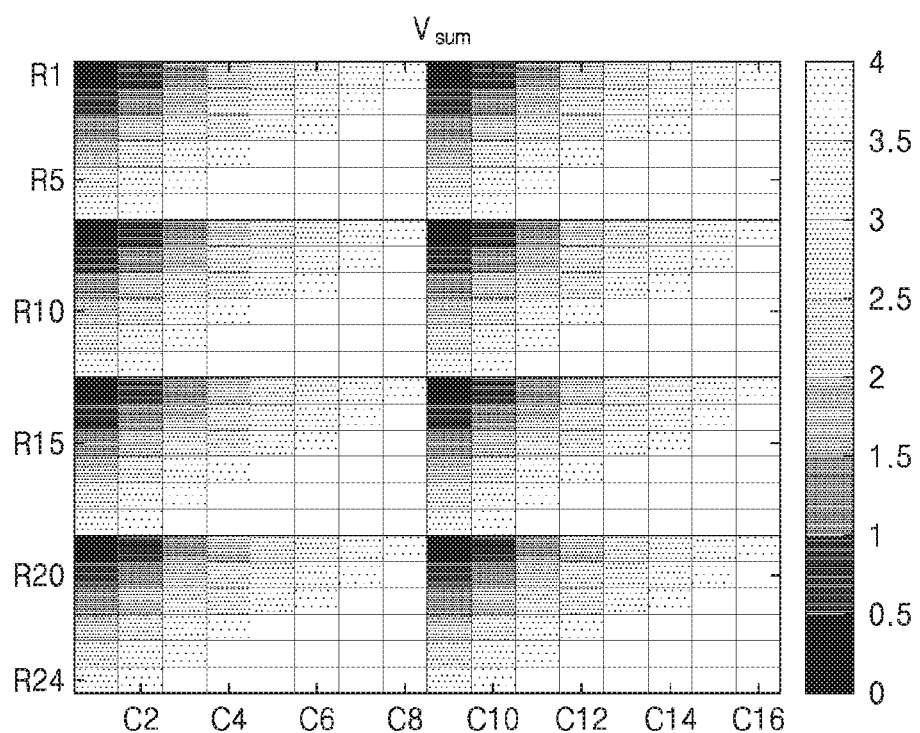
FIG. 16B is a distribution plot of voltages, where saturation of the antenna resonator is considered in the distribution plot illustrated in FIG. 16A according to an example embodiment.

A row direction driving voltage $V_R$ and a column direction driving voltage $V_C$ provided to each of the pixels P are input to the driving voltage conversion circuit 20 in the pixel P. The driving voltage conversion circuit 20 outputs a sum voltage by adding the row direction driving voltage $V_R$ and the column direction driving voltage $V_C$ by using the first transformation circuit 21 first. For example, FIG. 16A is a distribution plot of voltages output via first transformation circuits 21 of a plurality of pixels P, and FIG. 16B is a distribution plot of voltages, where saturation of the antenna resonator 10 is considered in the distribution plot illustrated in FIG. 16A. Referring to FIG. 16A, a sum voltage has a distribution including two cycles in a column direction and four cycles in a row direction, and a maximum value of the sum voltage is 8 V. However, when a voltage exceeding a threshold voltage is applied to the antenna resonator 10, a phase may not be expressed, and moreover, the antenna resonator 10 may be damaged. Thus, a voltage distribution that substantially contributes to phase shift is a distribution in which a considerable amount of the antenna resonators 10 are saturated at 4V as illustrated in FIG. 16B.

Figure 17:
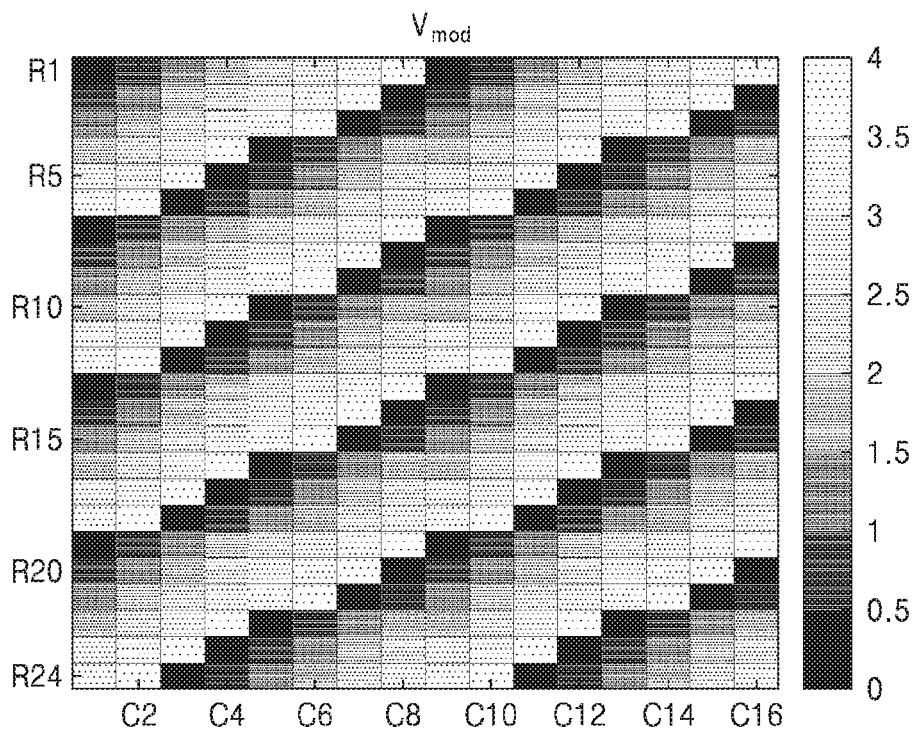
FIG. 17 is a distribution plot of voltages output via second transformation circuits of a plurality of pixels according to an example embodiment.

The second transformation circuit 22 has a function of converting a voltage exceeding a threshold voltage into an original target voltage. For example, FIG. 17 illustrates a distribution plot of voltages output via the second transformation circuits 22 of a plurality of pixels P. Referring to FIG. 17, voltages output by the second transformation circuit 22 have a voltage distribution as set as a target.

Figure 18:
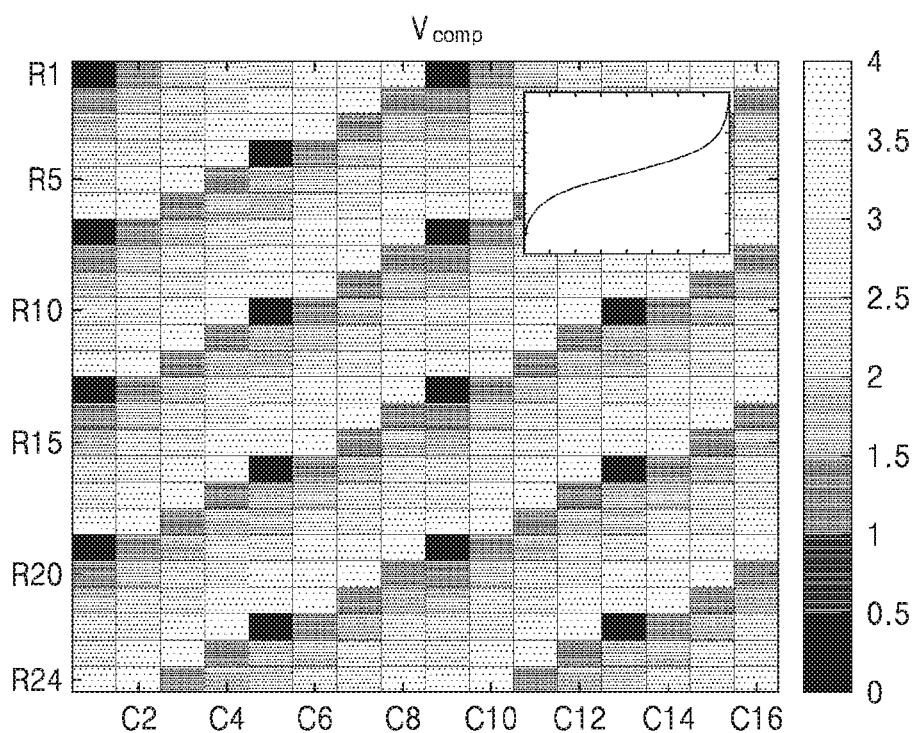
FIG. 18 is a distribution plot of voltages output via third transformation circuits of a plurality of pixels according to an example embodiment.

In addition, the third transformation circuit 23 converts a voltage according to non-linearity between an applied voltage applied to the antenna resonator 10 and a phase shift of reflected light caused by the antenna resonator 10. FIG. 18 is a distribution plot of voltages output via third transformation circuits 23 of a plurality of pixels P. Referring to FIG. 18, the voltage distribution illustrated in FIG. 17 is slightly changed via the third transformation circuit 23.

Figure 19:
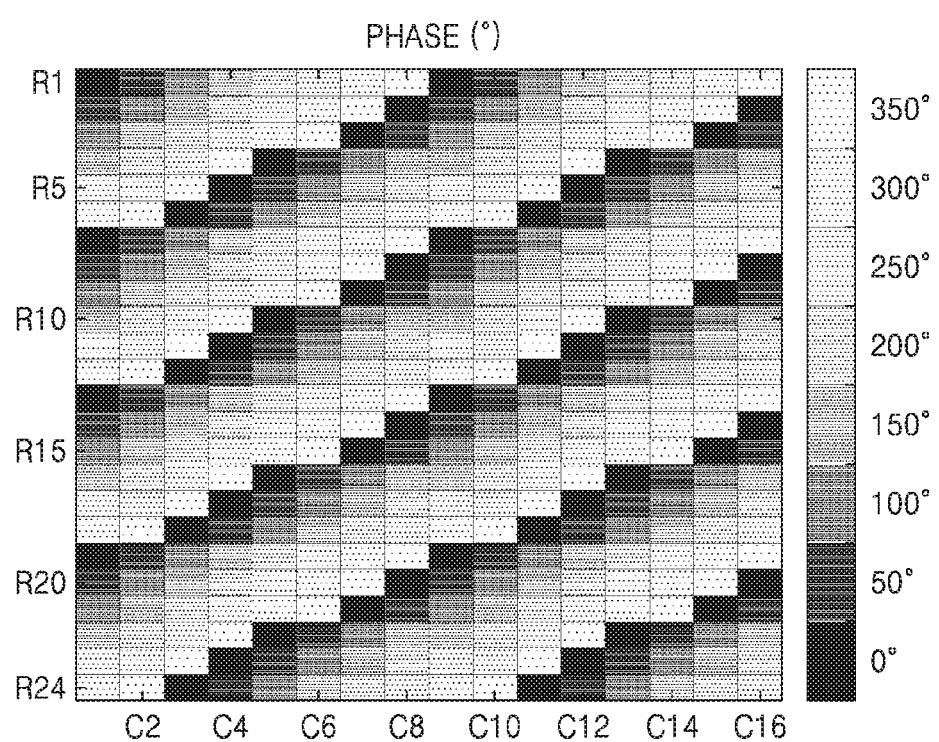
FIG. 19 is a distribution plot of phase shift generated by a plurality of two-dimensionally disposed antenna resonators of a beam scanning apparatus according to an example embodiment.

Then, an output of the third transformation circuit 23 is applied to the antenna resonator 10, and the antenna resonator 10 alters a phase of reflected light according to a voltage applied thereto. FIG. 19 is a distribution plot of phase shift caused by a plurality of two-dimensionally disposed antenna resonators 10 of a beam scanning apparatus 100. The phase shift distribution illustrated in FIG. 19 is similar to the voltage distribution illustrated in FIG. 17. Accordingly, by using the third transformation circuit 23, a linear relationship between an input voltage provided to the pixel P and a phase shift of reflected light caused by the antenna resonator 10 may be obtained.

Figure 20:
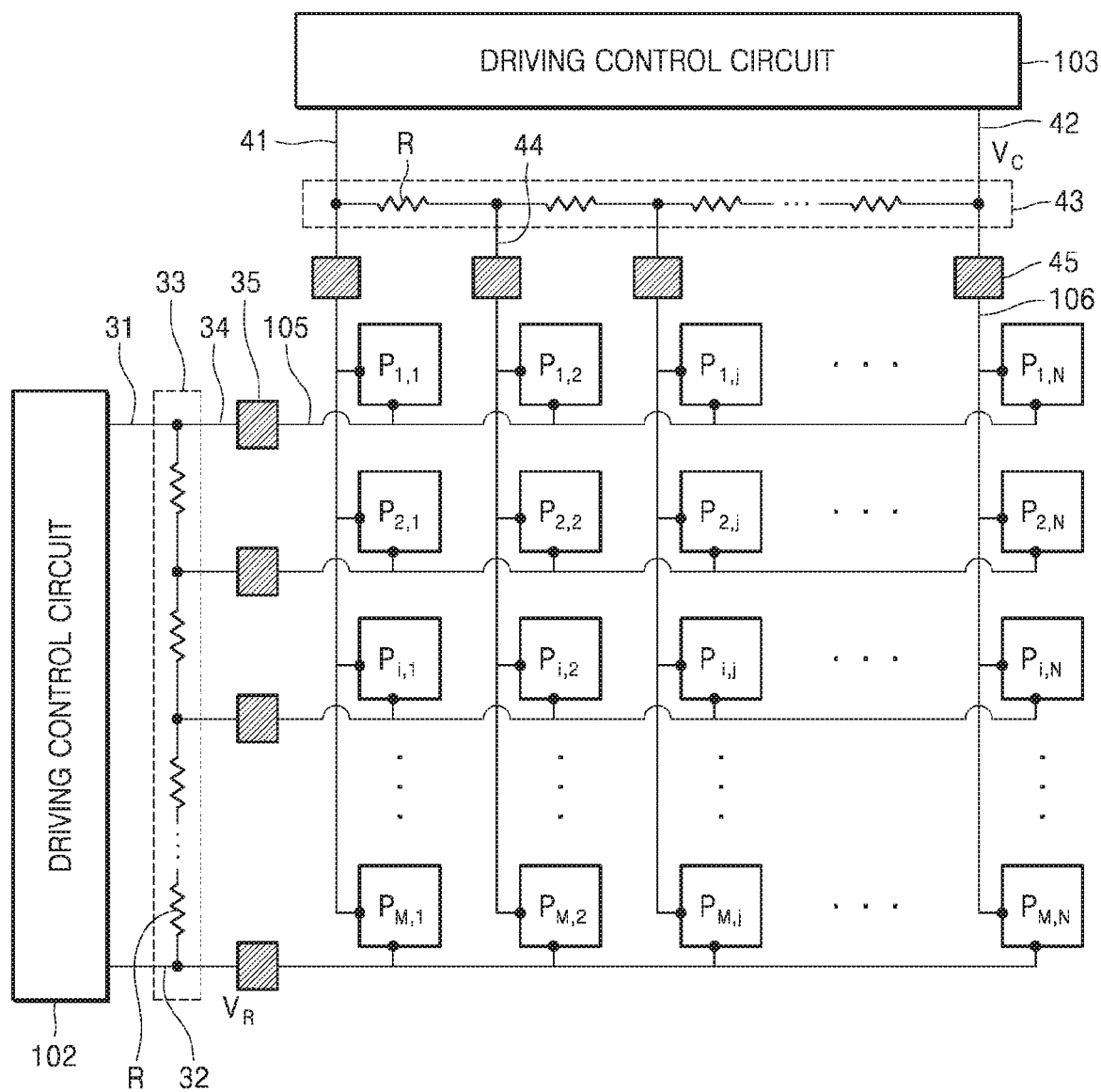
FIG. 20 is a circuit diagram illustrating a structure of a driving circuit of a beam scanning apparatus according to an example embodiment.

FIG. 20 is a circuit diagram illustrating a structure of a driving circuit of a beam scanning apparatus 200 according to an example embodiment. Referring to FIG. 20, the beam scanning apparatus 200 according to an example embodiment includes all the elements of the beam scanning apparatus 100 illustrated in FIG. 3, and may further include two row voltage input lines 31 and 32, a voltage distributor 33 connected between the two row voltage input lines 31 and 32 to distribute a voltage at certain voltage intervals, and voltage modulo calculation circuits 35 respectively connected between the plurality of row voltage lines 105 and the voltage distributor 33. In addition, the beam scanning apparatus 200 may further include two column voltage input lines 41 and 42, a voltage distributor 43 connected between the two column voltage input lines 41 and 42 to distribute a voltage at certain voltage intervals, and voltage modulo calculation circuits 45 respectively connected between the plurality of column voltage lines 106 and the voltage distributor 43. The row direction driving control circuit 102 is connected to the two row voltage input lines 31 and 32 to apply a voltage to each of the two row voltage input lines 31 and 32. The column direction driving control circuit 103 is connected to the two column voltage input lines 41 and 42 to apply a voltage to each of the two column voltage input lines 41 and 42.

The voltage distributor 33 has a function of providing a voltage by distributing a voltage at certain intervals to the plurality of voltage modulo calculation circuits 35 disposed between the two row voltage input lines 31 and 32. For example, the voltage distributor 33 may include a plurality of resistors R serially connected between the two row voltage input lines 31 and 32 and a plurality of voltage distribution lines 34 respectively connected between end portions of the plurality of resistors R and input portions of the plurality of voltage modulo calculation circuits 35. A number of the resistors R of the voltage distributor 33 is one less than a number of the plurality of voltage modulo calculation circuits 35. When the plurality of resistors R that are serially connected have all same resistance value, a voltage may be distributed and provided to the plurality of voltage modulo calculation circuits 35 at certain voltage intervals. Likewise, the voltage distributor 43 may include a plurality of resistors R serially connected between the two column voltage input lines 41 and 42 and a plurality of voltage distribution lines 44 respectively connecting between end portions of the plurality of resistors R and input portions of a plurality of voltage modulo calculation circuits 45. The number of resistors R of the voltage distributor 43 is one less than the number of the plurality of voltage modulo calculation circuits 45. In addition, all resistors R of the voltage distributor 43 may have an equal resistance value.

By using the voltage distributor 33, voltages sequentially input to the plurality of voltage modulo calculation circuits 35 have values that linearly increase or decrease between two voltages respectively input from the row direction driving control circuit 102 to the two row voltage input lines 31 and 32. By using the voltage distributor 43, voltages sequentially input to the plurality of voltage modulo calculation circuits 45 have values that linearly increase or decrease between two voltages respectively input from the column direction driving control circuit 103 to the two column voltage input lines 31 and 32.

Figure 21:
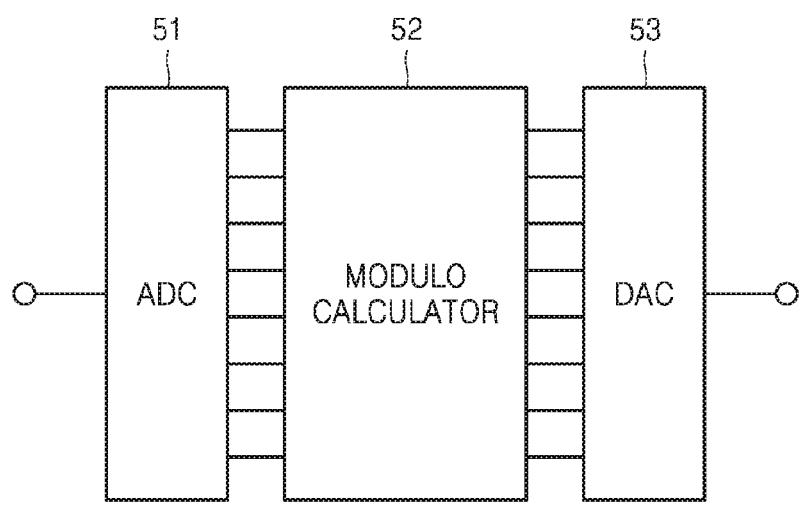
FIG. 21 is a schematic block diagram illustrating a structure of the voltage modulo calculation circuits illustrated in FIG. 20.

The plurality of voltage modulo calculation circuits 35 and 45 may respectively convert voltages provided by the voltage distributors 33 and 43 to modulo voltages obtained by dividing the voltages provided by the voltage distributors 33 and 43 by a threshold voltage, and respectively provide the modulo voltages to the plurality of row voltage lines 105 and the plurality of column voltage lines 106. For example, FIG. 21 is a schematic block diagram illustrating a structure of the voltage modulo calculation circuits 35 and 45 illustrated in FIG. 20. Referring to FIG. 21, the voltage modulo calculation circuits 35 and 45 may include, for example, an analog-to-digital converter 51, a modulo calculator 52, and a digital-to-analog converter 53 that are disposed sequentially. The analog-to-digital converter 51 is configured to convert an analog voltage provided by the voltage distribution lines 34 and 44 to a digital signal and provide the digital signal to the modulo calculator 52. The modulo calculator 52 is configured to divide an input numerical value by a numerical value of a threshold voltage and outputs a remainder of the division. In addition, the digital-to-analog converter 53 is configured to convert a digital output signal of the modulo calculator 52 to an analog voltage and provide the analog voltage to the row voltage line 105 or the column voltage line 106.

Figure 22:
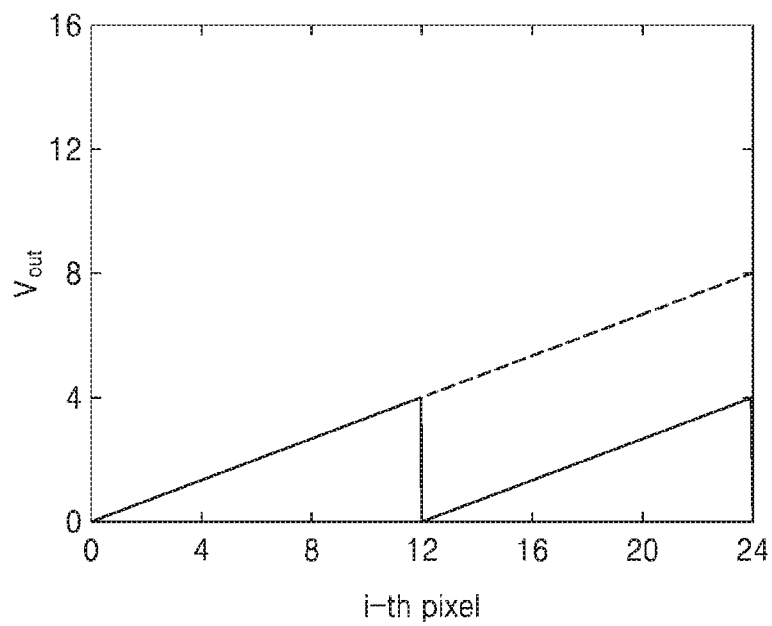
FIG. 22 is a graph showing a voltage distribution of a voltage applied to a plurality of row voltage lines in a row direction when 0 V and 8 V are respectively applied to two row voltage input lines according to an example embodiment.
Figure 23:
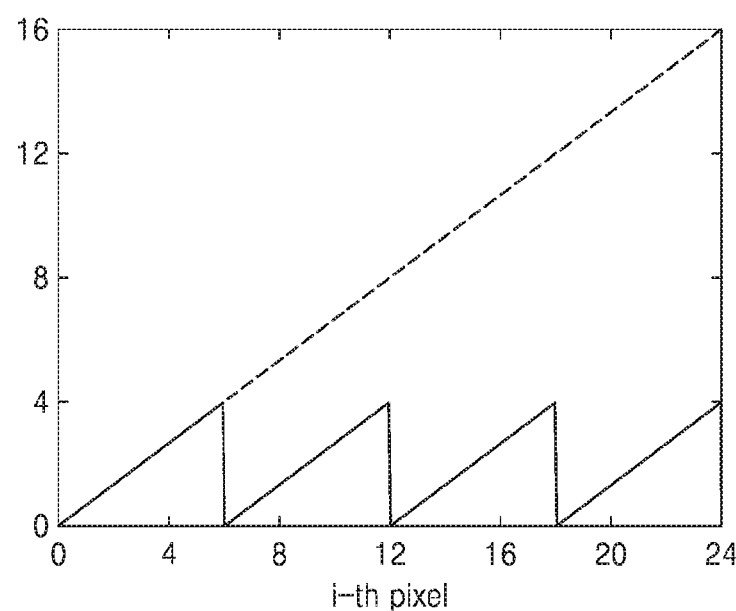
FIG. 23 is a graph showing a voltage distribution of a voltage applied to a plurality of row voltage lines in a row direction when 0 V and 16 V are respectively applied to two row voltage input lines according to an example embodiment.

By using the plurality of voltage modulo calculation circuits 35 and 45, a distribution of voltages provided to the plurality of row voltage lines 105 or the plurality of column voltage lines 106 may have a saw-toothed voltage distribution that linearly varies according in a certain cycle. For example, FIG. 22 is a graph showing a voltage distribution of a voltage applied to the plurality of row voltage lines 105 in a row direction when 0 V and 8 V are respectively applied to the two row voltage input lines 31 and 32. In addition, FIG. 23 is a graph showing a voltage distribution of a voltage provided to the plurality of row voltage lines 105 in a row direction when 0 V and 16 V are respectively applied to two row voltage input lines 31 and 32. In FIGS. 22 and 23, a broken line indicates a distribution of a voltage provided in a row direction to the plurality of voltage modulo calculation circuits 35 and 45. As indicated by a solid line in FIGS. 22 and 23, a cycle of a saw-toothed voltage distribution of voltages provided to the plurality of row voltage lines 105 may be varied according to a voltage applied to each of the two row voltage input lines 31 and 32.

Accordingly, the beam scanning apparatus 200 may be driven just using four pieces of voltage information, that is, two pieces of voltage information applied to the two row voltage input lines 31 and 32 and two pieces of voltage information input to the two column voltage input lines 41 and 42. In addition, the beam scanning apparatus 200 may also be driven by using just two pieces of voltage information by grounding one row voltage input line 31 and applying a voltage that is between a (+) threshold voltage and a (−) threshold voltage to the other row voltage input line 32, and by grounding one column voltage input line 41 and applying a voltage that is between a (+) threshold voltage and a (−) threshold voltage to the other column voltage input line 42.

The beam scanning apparatuses 100 and 200 may be included in an optical apparatus, for example, a three-dimensional sensor such as a LiDAR for vehicles, or a depth sensor used in a three-dimensional camera to enhance precision of the optical apparatus. For example, FIG. 24 is a block diagram illustrating a schematic structure of an optical apparatus 1000 according to an example embodiment.

Figure 24:
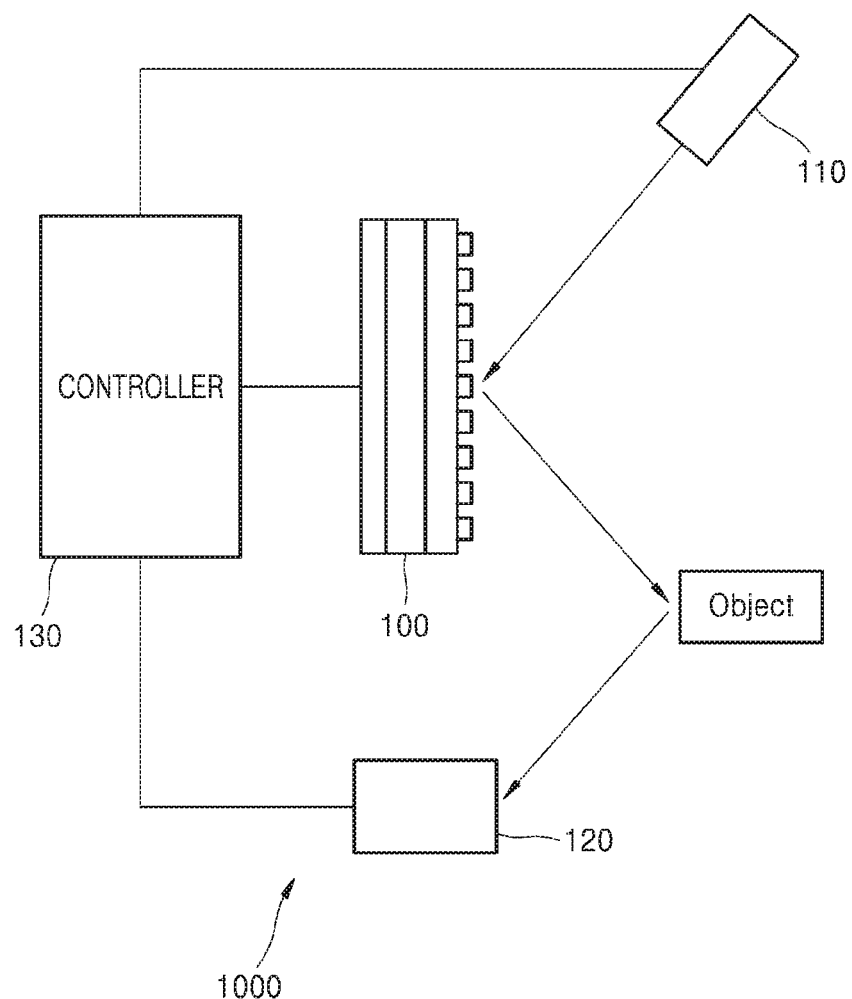
FIG. 24 is a schematic block diagram illustrating a structure of an optical apparatus according to an example embodiment.

Referring to FIG. 24, the optical apparatus 1000 according to an example embodiment may include a light source 110 providing light, a beam scanning apparatus 100 reflecting light from the light source 110 and electrically controlling a reflection angle of reflected light, a photodetector 120 detecting light emitted from the light source 110, reflected by the beam scanning apparatus 100, and reflected by an external object, and a controller 130 calculating information about the external object based on a measurement result of the photodetector 120. The controller 130 may control operations of the beam scanning apparatus 100, the light source 110, and the photodetector 120. For example, the controller 130 may control an on/off operation of the light source 110 and the photodetector 120 and a beam scanning operation of the beam scanning apparatus 100. The light source 110 may be, for example, a laser diode (LD) or a light-emitting diode (LED) each emitting a near-infrared ray in a band between about 800 nm to about 1500 nm.

The optical apparatus 1000 may periodically radiate light to various areas nearby by using the beam scanning apparatus 100 to acquire information about objects at nearby multiple locations. While FIG. 24 illustrates the optical apparatus 1000 using the beam scanning apparatus 100, as an example, the optical apparatus 1000 may also use the beam scanning apparatus 200.

In addition, the optical apparatus 1000 illustrated in FIG. 24 may be used, other than in three-dimensional sensors or depth sensors, for LiDARs for robots, LiDARs for drones, security-purpose intruder surveillance systems, subway screen door obstacle detection systems, face recognition sensors, motion recognition and object profiling devices, or the like.

Figure 25:
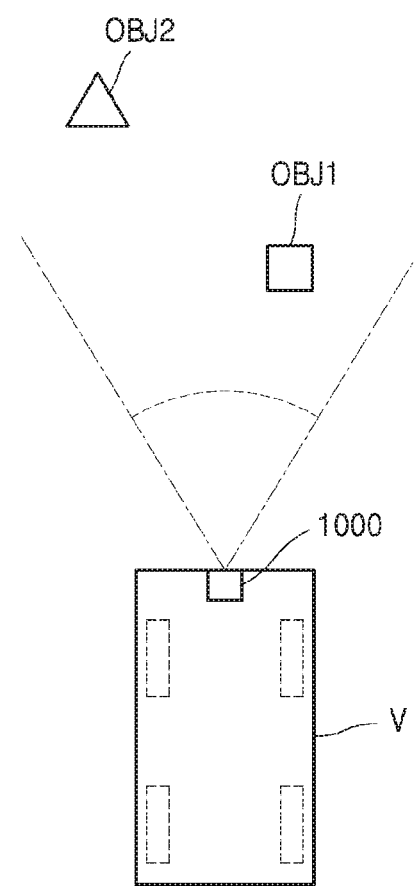
FIG. 25 is a schematic example where an optical apparatus according to an example embodiment is used as a LiDAR for vehicles.

For example, FIG. 25 is a view illustrating a schematic structure of an optical apparatus 1000 according to an example embodiment, used as a LiDAR for vehicles. Referring to FIG. 25, the optical apparatus 1000 may be mounted in a vehicle V and detect various objects OBJ1 and OBJ2 in front the vehicle V by scanning a beam in a front area where the vehicle V is travelling. When the optical apparatus 1000 is a LiDAR for vehicles, the controller 130 may calculate information such as a distance with respect to the objects OBJ1 and OBJ2 in front of or at the back of the vehicle V or relative speeds or azimuth positions of the objects OBJ1 and OBJ2 or the like. For example, the controller 130 may determine distances with respect to the objects OBJ1 and OBJ2 by using a time difference between a time when light is emitted from the light source 110 and a time when the photodetector 120 has detected the light, and may detect azimuth angle positions of the objects OBJ1 and OBJ2 based on a location where light is irradiated by using the beam scanning apparatuses 100 and 200. In addition, the controller 130 may determine a relative speed with respect to the objects OBJ1 and OBJ2 based on a variation in the time difference between the time when light is emitted from the light source 110 and the time when the photodetector 120 detected the light. In addition, when the optical apparatus 1000 is a distance sensor of a three-dimensional camera, the controller 130 may estimate a distance information about distances with respect to various subjects within a field of view of the camera.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A beam scanning apparatus comprising:
a plurality of antenna resonators disposed two-dimensionally in a row direction and a column direction;
a plurality of row voltage lines that are configured to provide a plurality of row driving voltages in the row direction;
a plurality of column voltage lines that are configured to provide a plurality of column driving voltages in the column direction; and
a driving voltage conversion circuit configured to control a driving voltage applied to each of the plurality of antenna resonators based on a row driving voltage that is provided from each of the plurality of row voltage lines and a column driving voltage that is provided from each of the plurality of column voltage lines.

2. The beam scanning apparatus of claim 1, wherein the plurality of row voltage lines are configured to simultaneously provide the plurality of row driving voltages, and
the plurality of column voltage lines are configured to simultaneously provide the plurality of column driving voltages.

3. The beam scanning apparatus of claim 1, wherein each of the plurality of row driving voltages and each of the plurality of column driving voltages are in a range between 0 volt and a threshold voltage, and
wherein the threshold voltage is a voltage at which a phase shift of reflected light by each of the plurality of antenna resonators is at a maximum.

4. The beam scanning apparatus of claim 3, wherein each of the plurality of row driving voltages in the row direction that is provided by each of the plurality of row voltage lines has a saw-toothed voltage distribution that varies linearly in a cycle in the row direction.

5. The beam scanning apparatus of claim 4, wherein the plurality of row voltage lines comprise a first row voltage line providing a first voltage that is between 0 volts and the threshold voltage, a second row voltage line providing a second voltage that is between 0 volts and the threshold voltage, and at least one row voltage line that is disposed between the first row voltage line and the second row voltage line and provides a linearly increasing or decreasing voltage between the first voltage and the second voltage.

6. The beam scanning apparatus of claim 3, wherein each of the plurality of column driving voltages that is provided by each of the plurality of column voltage lines has a saw-toothed voltage distribution that varies linearly in a cycle in the column direction.

7. The beam scanning apparatus of claim 6, wherein the plurality of column voltage lines comprise a first column voltage line providing a third voltage that is between 0 volts and the threshold voltage, a second column voltage line providing a fourth voltage that is between 0 volts and the threshold voltage, and at least one column voltage line that is disposed between the first column voltage line and the second column voltage line and provides a linearly increasing or decreasing voltage between the third voltage and the fourth voltage.

8. The beam scanning apparatus of claim 1, wherein the driving voltage conversion circuit comprises:
- a first transformation circuit configured to add a row driving voltage that is provided from a row voltage line corresponding to the driving voltage conversion circuit and a column driving voltage that is provided from a column voltage line corresponding to the driving voltage conversion circuit;
- a second transformation circuit configured to output an output voltage of the first transformation circuit based on the output voltage of the first transformation circuit being less than a threshold voltage at which a phase shift of reflected light by each of the plurality of antenna resonators is at a maximum, and output a voltage obtained by subtracting the threshold voltage from the output voltage of the first transformation circuit based on the output voltage of the first transformation circuit being greater than the threshold voltage; and
- a third transformation circuit configured to alter an output voltage of the second transformation circuit according to non-linearity between a voltage applied to each of the plurality of antenna resonators and a phase shift of the reflected light caused by each of the plurality of antenna resonators.

9. The beam scanning apparatus of claim 8, wherein each of the plurality of antenna resonators comprises:
- an electrode layer;
- an active layer disposed on the electrode layer;
- an insulating layer disposed on the active layer; and
- an antenna layer disposed on the insulating layer, and wherein an output of the third transformation circuit is electrically connected to the antenna layer or the electrode layer.

10. The beam scanning apparatus of claim 8, wherein the first transformation circuit comprises an op-amp comprising a first input port, a second input port, and an output port, and wherein the first input port of the op-amp is connected to the row voltage line, the second input port of the op-amp is connected to the column voltage line, and the output port of the op-amp is connected to an input of the second transformation circuit.

11. The beam scanning apparatus of claim 10, wherein the first transformation circuit further comprises:
- a first resistor connected to the first input port of the op-amp;
- a second resistor connected to the second input port of the op-amp;
- a third resistor connected between the first input port and the output port of the op-amp; and
- a fourth resistor connected between the second input port of the op-amp and ground.

12. The beam scanning apparatus of claim 8, wherein the second transformation circuit comprises:
- a comparison circuit configured to compare the output voltage of the first transformation circuit with the threshold voltage;
- a first output port configured to output the output voltage of the first transformation circuit without change;
- a voltage difference circuit configured to output a voltage obtained by subtracting the threshold voltage from the output voltage of the first transformation circuit;
- a second output port connected to an input port of the third transformation circuit; and
- a switch connecting the second output port to the first output port or to the voltage difference circuit based on a result of the comparison by the comparison circuit.

13. The beam scanning apparatus of claim 12, wherein the first output port of the second transformation circuit comprises an op-amp having a gain of 1.

14. The beam scanning apparatus of claim 12, wherein the voltage difference circuit of the second transformation circuit comprises an op-amp that has a gain of 1 and an offset which is a negative threshold voltage.

15. The beam scanning apparatus of claim 8, wherein the third transformation circuit comprises:
- an analog-to-digital converter configured to convert the output voltage of the second transformation circuit into a digital signal;
- a non-linear compensation circuit configured to convert the digital signal provided by the analog-to-digital converter into a digital signal having an inverse functional relationship with a voltage-phase shift function of each of the plurality of antenna resonators; and
- a digital-to-analog converter configured to convert an output of the non-linear compensation circuit into an analog voltage.

16. The beam scanning apparatus of claim 15, wherein the non-linear compensation circuit comprises a predefined lookup table comprising an input digital signal and an output digital signal.

17. The beam scanning apparatus of claim 8, further comprising:
- two column voltage input lines;
- a first voltage distributor connected between the two column voltage input lines, the first voltage distributor configured to distribute a voltage at certain voltage intervals; and
- a plurality of first voltage modulo calculation circuits that are each connected between the plurality of column voltage lines and the first voltage distributor, each of the plurality of first voltage modulo calculation circuits being configured to provide a voltage modulo, that is obtained by dividing a voltage provided from the first voltage distributor by the threshold voltage, to a corresponding column voltage line from among the plurality of column voltage lines.

18. The beam scanning apparatus of claim 17, wherein the first voltage distributor comprises:
- a plurality of resistors serially connected between the two column voltage input lines; and
- a plurality of voltage distribution lines disposed at both ends of each of the plurality of resistors and connected to an input unit of the plurality of first voltage modulo calculation circuits, respectively.

19. The beam scanning apparatus of claim 18, wherein all of the plurality of resistors have a same resistance value.

20. The beam scanning apparatus of claim 17, further comprising:
- two row voltage input lines;
- a second voltage distributor connected between the two row voltage input lines, the second voltage distributor configured to distribute a voltage at certain voltage intervals; and
- a plurality of second voltage modulo calculation circuits that are each connected between the plurality of row voltage lines and the second voltage distributor, each of the plurality of second voltage modulo calculation circuits being configured to provide a voltage modulo, that is obtained by dividing a voltage provided from the second voltage distributor by the threshold voltage, to a corresponding row voltage line from among the plurality of row voltage lines.

21. The beam scanning apparatus of claim 20, wherein the second voltage distributor comprises:
a plurality of resistors serially connected between the two row voltage input lines; and
a plurality of voltage distribution lines disposed at both ends of each of the plurality of resistors and connected to an input unit of the plurality of second voltage modulo calculation circuits, respectively.

22. An optical apparatus comprising:
a light source configured to emit light;
a beam scanning apparatus configured to reflect the light emitted by the light source and electrically control a reflection angle of the reflected light; and
an photodetector configured to detect light reflected by an external object that is irradiated with the reflected light from the beam scanning apparatus,
wherein the beam scanning apparatus comprises:
a plurality of antenna resonators disposed two-dimensionally in a row direction and a column direction;
a plurality of row voltage lines that are configured to provide a plurality of row driving voltages in the row direction;
a plurality of column voltage lines that are configured to provide a plurality of column driving voltages in the column direction; and
a driving voltage conversion circuit controlling a driving voltage applied to each of the plurality of antenna resonators based on a row driving voltage provided from each of the plurality of row voltage lines and a column driving voltage provided from each of the plurality of column voltage lines.

23. The optical apparatus of claim 22, further comprising a controller configured to obtain position information of the external object based on a measurement by the photodetector.

24. The optical apparatus of claim 22, comprising a distance sensor, a three- dimensional sensor, or a vehicle radar.

25. A beam scanning apparatus comprising:
a plurality of antenna resonators disposed two-dimensionally in a row direction and a column direction;
a plurality of pixels disposed two-dimensionally in the row direction and the column direction, the plurality of pixels corresponding to the plurality of antenna resonators, respectively;
a plurality of row voltage lines that are configured to provide a plurality of row driving voltages in the row direction;
a plurality of column voltage lines that are configured to provide a plurality of column driving voltages in the column direction; and
a driving voltage conversion circuit configured to control a driving voltage applied to each of the plurality of pixels based on a row driving voltage that is provided from each of the plurality of row voltage lines and a column driving voltage that is provided from each of the plurality of column voltage lines,
wherein the plurality of pixels are configured to control the driving voltage applied to each of the plurality of antenna resonators.

* * * * *